US008979033B2

(12) United States Patent
Hunter et al.

(10) Patent No.: US 8,979,033 B2
(45) Date of Patent: Mar. 17, 2015

(54) GAS GUN LAUNCHER

(75) Inventors: John William Hunter, Escondido, CA (US); Harry E. Cartland, Carmel, CA (US); Philip James Sluder, El Cajon, CA (US); Richard Edward Twogood, Dublin, CA (US)

(73) Assignee: QuickLaunch, Inc., Dublin, CA (US)

( * ) Notice: Subject to any disclaimer, the term of this patent is extended or adjusted under 35 U.S.C. 154(b) by 530 days.

(21) Appl. No.: 13/430,671

(22) Filed: Mar. 26, 2012

(65) Prior Publication Data
US 2012/0187249 A1     Jul. 26, 2012

Related U.S. Application Data

(63) Continuation of application No. PCT/US2010/050437, filed on Sep. 27, 2010.

(60) Provisional application No. 61/277,544, filed on Sep. 25, 2009, provisional application No. 61/277,543, filed on Sep. 25, 2009.

(51) Int. Cl.
| | |
|---|---|
| *F41B 11/68* | (2013.01) |
| *B64G 1/00* | (2006.01) |
| *F41F 1/00* | (2006.01) |
| *F41A 1/02* | (2006.01) |
| *F42B 15/01* | (2006.01) |

(52) U.S. Cl.
CPC ... *F41F 1/00* (2013.01); *F41A 1/02* (2013.01); *F41B 11/68* (2013.01); *B64G 1/002* (2013.01); *F42B 15/01* (2013.01)
USPC ...................................... 244/158.5; 89/1.816

(58) Field of Classification Search
CPC .................................. F41B 11/68; B64F 11/68

USPC ................ 244/63, 171.3, 271.4, 158.5; 89/8, 89/1.815, 1.816, 1.817
See application file for complete search history.

(56) References Cited

U.S. PATENT DOCUMENTS

| | | | |
|---|---|---|---|
| 2,380,317 | A | 7/1945 | Kline et al. |
| 2,993,412 | A | 7/1961 | Goldsmith |

(Continued)

FOREIGN PATENT DOCUMENTS

| | | |
|---|---|---|
| WO | WO/2011/038365 A1 | 3/2011 |
| WO | WO/2011/038369 A1 | 3/2011 |

OTHER PUBLICATIONS

PCT/US2010/050441 International Search Report dated Nov. 26, 2010 and Written Opinion dated Nov. 11, 2010; Alexandria, Virginia, USA.

(Continued)

*Primary Examiner* — Brian M O'Hara
(74) *Attorney, Agent, or Firm* — Strategic Innovation IP Law Offices, P.C.

(57) ABSTRACT

A gas gun launcher having a pump tube and a launch tube with a first end of the launch tube slidably inserted into a second end of the pump tube. A sliding seal is employed to retain the gas within the launch tube and the pump tube A launch tube alignment system is preferably automatic, again to enhance the accuracy of launches. And an embodiment of the gas gun launcher suitable for use in water such as an ocean or large lake preferably utilizes a neutrally buoyant launch tube and a neutrally buoyant pump tube. And a fast-closing muffler at the second end of the launch tube conserves the light gas utilized for launching a vehicle.

26 Claims, 18 Drawing Sheets

(56) References Cited

U.S. PATENT DOCUMENTS

| | | | |
|---|---|---|---|
| 3,131,597 A * | 5/1964 | Smith et al. | 89/8 |
| 3,132,562 A * | 5/1964 | Frevel | 124/60 |
| 3,245,318 A | 4/1966 | Finkelstein et al. | |
| 3,384,323 A | 5/1968 | Gilbert et al. | |
| 3,420,053 A * | 1/1969 | Feder et al. | 60/39.01 |
| 3,427,648 A | 2/1969 | Manning et al. | |
| 3,453,960 A | 7/1969 | Qualls | |
| 3,597,969 A | 8/1971 | Curchack | |
| 3,665,861 A | 5/1972 | Jaslow | |
| 3,706,281 A | 12/1972 | Hatakeyama | |
| 3,714,900 A | 2/1973 | Feldmann | |
| 3,738,279 A | 6/1973 | Eyre et al. | |
| 3,750,578 A | 8/1973 | Blajda | |
| 3,759,184 A | 9/1973 | Blajda et al. | |
| 3,769,912 A | 11/1973 | Friend | |
| 3,771,458 A | 11/1973 | Schweimier et al. | |
| 3,780,658 A | 12/1973 | de Longueville et al. | |
| 3,802,345 A | 4/1974 | La Costa | |
| 3,834,314 A | 9/1974 | Young | |
| 3,905,299 A | 9/1975 | Feldmann | |
| 4,038,903 A | 8/1977 | Wohlford | |
| 4,049,367 A | 9/1977 | Tominaga et al. | |
| 4,181,152 A | 1/1980 | Nicoloff | |
| 4,284,008 A | 8/1981 | Kirkendall et al. | |
| 4,314,510 A | 2/1982 | Jeter et al. | |
| 4,434,718 A | 3/1984 | Kopsch et al. | |
| 4,669,212 A | 6/1987 | Jackson et al. | |
| 4,702,027 A | 10/1987 | Stanley | |
| 4,709,638 A | 12/1987 | Broden et al. | |
| 4,800,816 A | 1/1989 | Meyer | |
| 4,886,223 A | 12/1989 | Gartner | |
| 4,982,669 A | 1/1991 | Bisping et al. | |
| 5,012,744 A | 5/1991 | Sowash | |
| 5,165,041 A | 11/1992 | Bjerke et al. | |
| 5,167,386 A | 12/1992 | Laquer et al. | |
| 5,404,816 A | 4/1995 | Burri | |
| 5,481,980 A | 1/1996 | Engel et al. | |
| 5,666,897 A | 9/1997 | Armstrong | |
| 5,966,858 A | 10/1999 | Curtis et al. | |
| 6,086,020 A | 7/2000 | Machiussi | |
| 6,116,136 A | 9/2000 | Kirschner et al. | |
| 6,234,082 B1 | 5/2001 | Cros et al. | |
| 6,257,527 B1 | 7/2001 | Redding, Jr. | |
| 6,298,786 B1 | 10/2001 | Grosskrueger et al. | |
| 6,494,406 B1 | 12/2002 | Fukushima et al. | |
| 6,530,543 B2 | 3/2003 | Redding, Jr. | |
| 6,536,350 B2 | 3/2003 | Cartland et al. | |
| 6,685,141 B2 | 2/2004 | Penn | |
| 7,526,988 B2 | 5/2009 | Elder | |
| 7,775,148 B1 | 8/2010 | McDermott | |
| 8,519,312 B1 | 8/2013 | Merems | |
| 8,536,502 B2 | 9/2013 | Hunter et al. | |
| 2008/0257192 A1 | 10/2008 | Schaeffer | |
| 2009/0211225 A1 | 8/2009 | Nyberg et al. | |
| 2010/0212481 A1 | 8/2010 | Koth | |
| 2012/0187249 A1 | 7/2012 | Hunter et al. | |
| 2013/0319212 A1 | 12/2013 | Hunter | |

OTHER PUBLICATIONS

Elahi, Amina; Ready, Aim, Resupply; Popular Science; Feb. 2010; 2 pp.

Gilreath, H., et al.; The Feasibility of Launching Small Satellites with a Light Gas Gun; 12th AIAA/USU Conference (Aug. 31, 1998) on Small Satellites; SSC98-III-6; pp. 1-20.

Gilreath, Harold E., et al., Gun-Launched Satellites; John Hopkins APL Technical Digest; Jul.-Sep. 1999, 17 pp.; vol. 20, No. 3; 1999 by the John Hopkins University Applied Physics Laboratory.

Gourley, Scott R.; Sharp Gun Promises to Deliver as Launcher; Jane's Defense Weekly; The Global Defense Weekly; Jun. 19, 1996; pp. 91-92.

Gourley, Scott R.; The Jules Verne Gun; Popular Mechanics; Dec. 1996; 5 pp.

Henderson, Breck W.; Livermore Proposes Light Gas Gun for Launch of Small Payloads; Aviation Week & Space Technology; Jul. 23, 1990; pp. 78-79.

May, Michael M.; The SHARP Gas Gun: Shooting Payloads into Space Jules Verne's Way; Energy Technology Review (E&TR), University of California, Lawrence Livermore National Laboratory; Jul. 1993; 13 pp.

PCT/US2010/050441 International Preliminary Report on Patentability dated Mar. 27, 2012 with Written Opinion dated Nov. 11, 2010; International Bureau of WIPO; Geneva, Switzerland.

PCT/US2010/50437 International Preliminary Report on Patentability dated Mar. 27, 2012 and and Written Opinion dated Dec. 10, 2010; International Bureau of WIPO; Geneva, Switzerland.

PCT/US2010/50437 International Search Report and Written Opinion dated Dec. 10, 2010; Alexandria, Virginia, USA.

Scott, William B., Sharp Gun Accelerates Scramjets to Mach 9; Aviation Week & Space Technology; Sep. 9, 1996; 3 pp; A Publication of the McGraw-Hill Companies.

U.S. Appl. No. 13/430,678 Amendment dated Feb. 28, 2013.
U.S. Appl. No. 13/430,678 Amendment dated Jun. 20, 2013.
U.S. Appl. No. 13/430,678 Amendment dated Oct. 2, 2012.
U.S. Appl. No. 13/430,678 Interview Summary dated Jul. 1, 2013.
U.S. Appl. No. 13/430,678 Notice of Allowance dated Jun. 28, 2013.
U.S. Appl. No. 13/430,678 Office Action dated Dec. 3, 2012.
U.S. Appl. No. 13/430,678 Office Action dated Jul. 2, 2012.
U.S. Appl. No. 13/430,678 Office Action dated May 8, 2013.
U.S. Appl. No. 13/430,678 Office Action (Response to Rule 312 Communication) dated Aug. 20, 2013.
U.S. Appl. No. 13/963,893 Notice of Allowance dated Nov. 18, 2013.
Wolkomir, Richard; Shooting Right for the Stars With one Gargantuan Gas Gun; Smithsonian; Jan. 1996; 9 pp.
U.S. Appl. No. 13/430,678 Amendment after Allowance dated Aug. 9, 2013.

\* cited by examiner

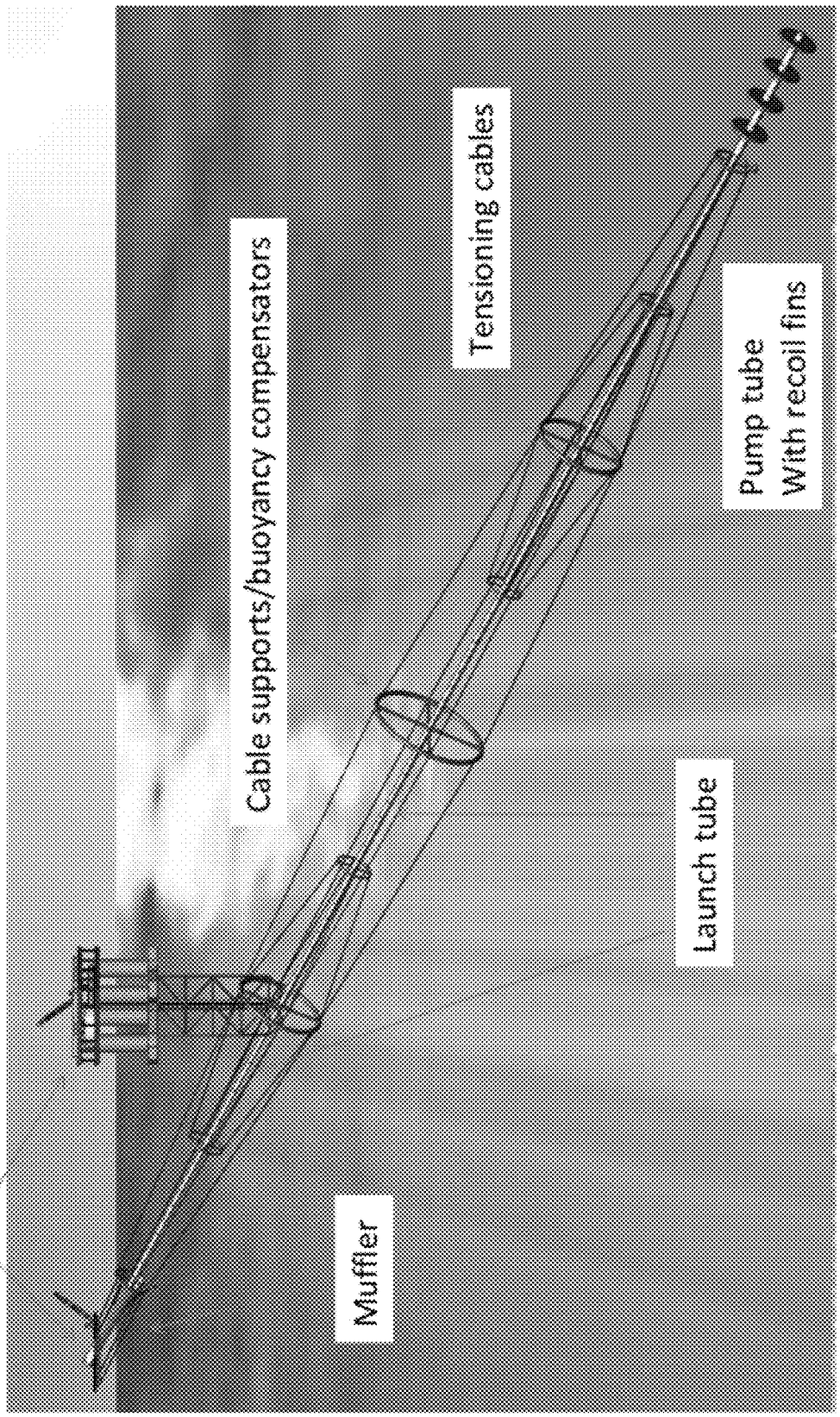
Figure 1. Ocean Based Quicklauncher

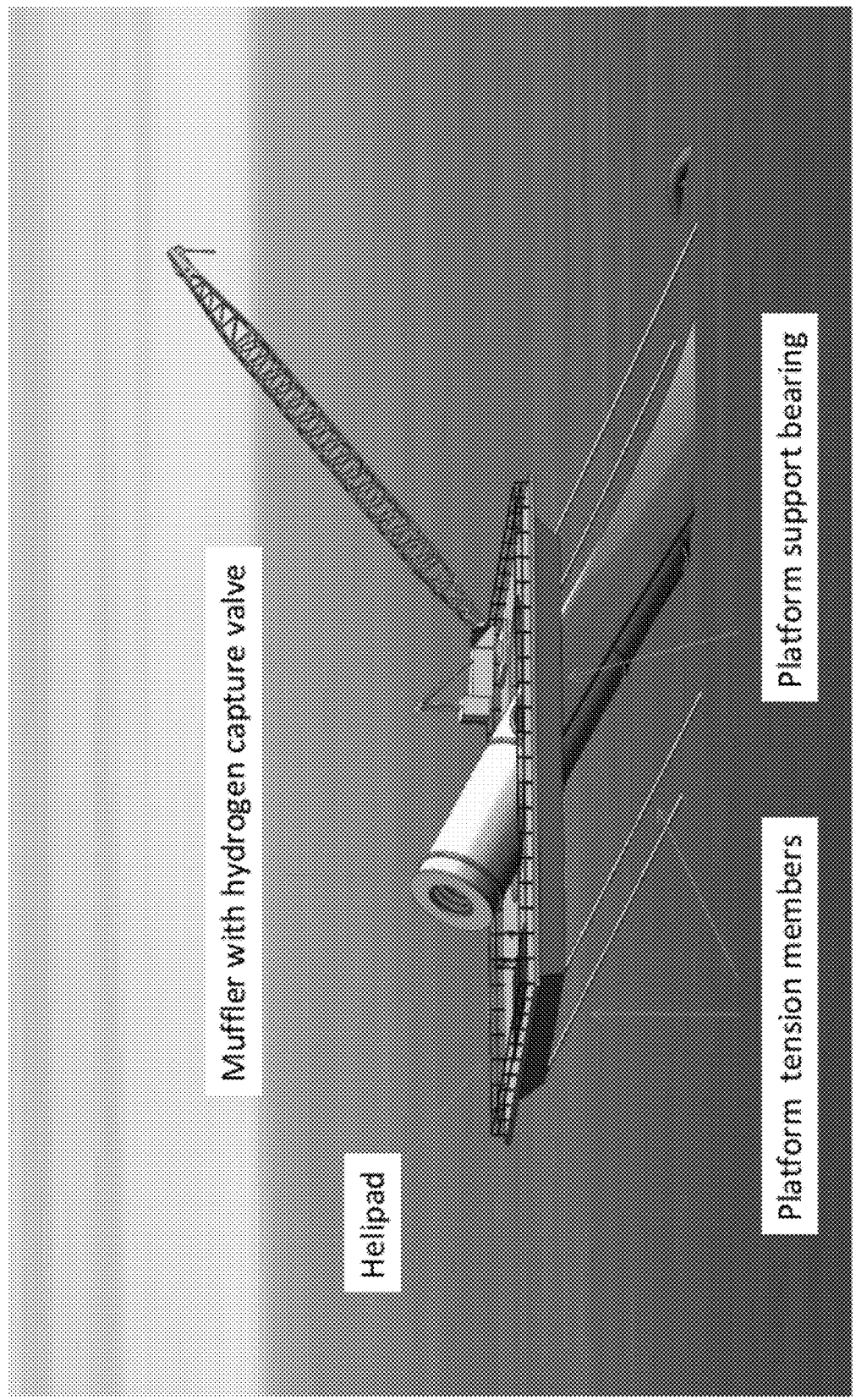
Figure 2. Muffler platform

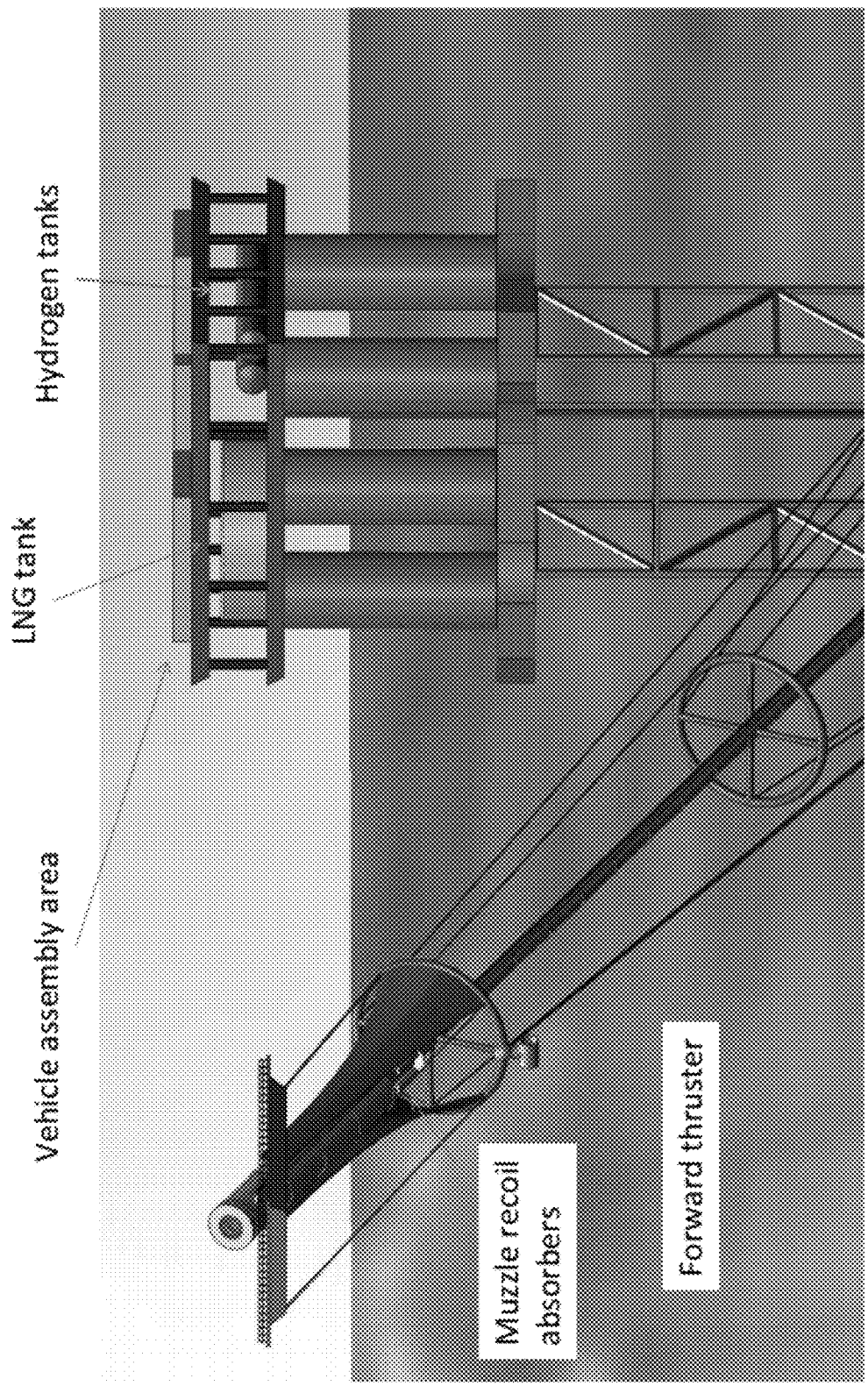
Figure 3. Muffler recoil mechanism and mobile maintenance platform

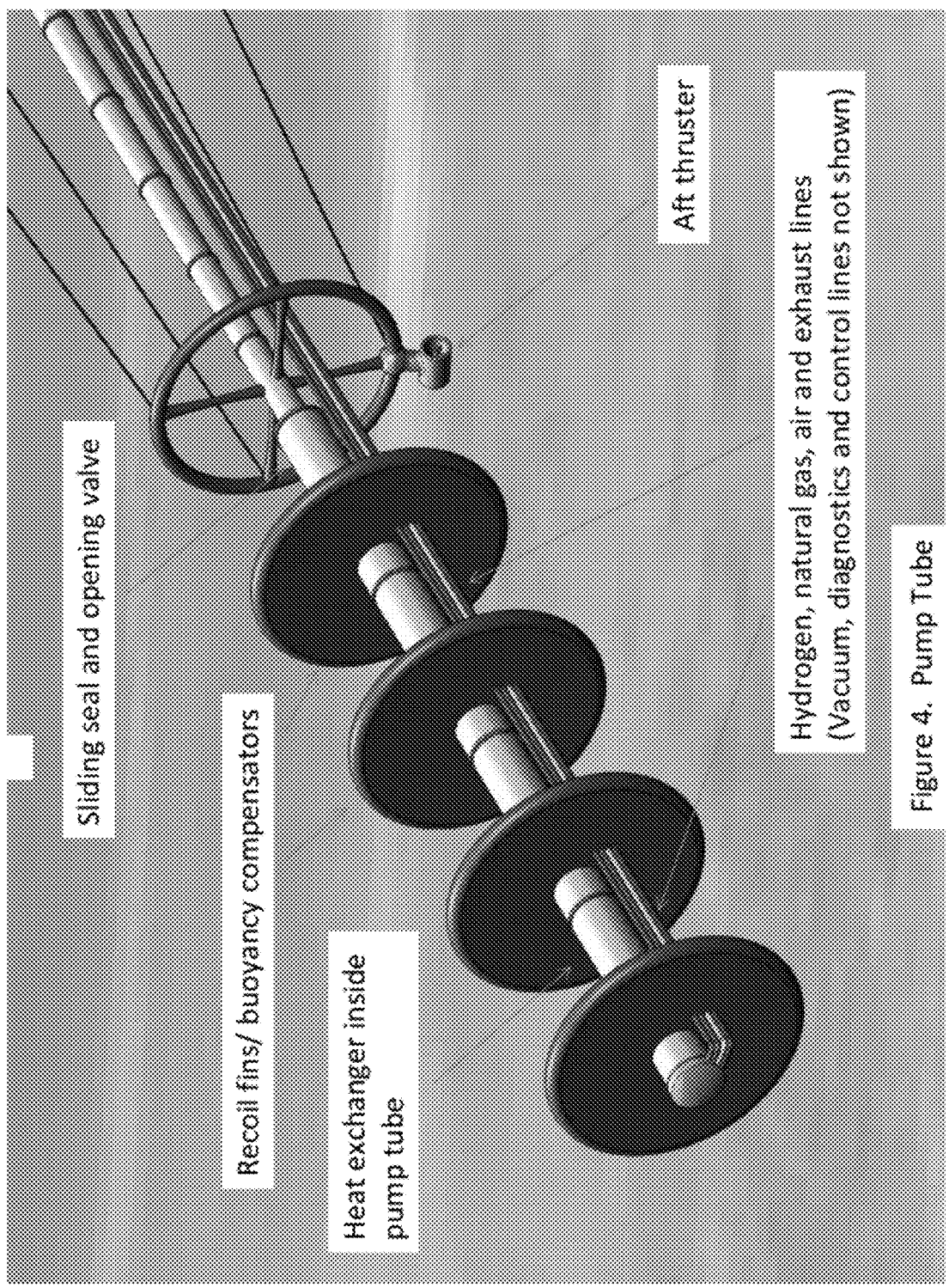
Figure 4. Pump Tube

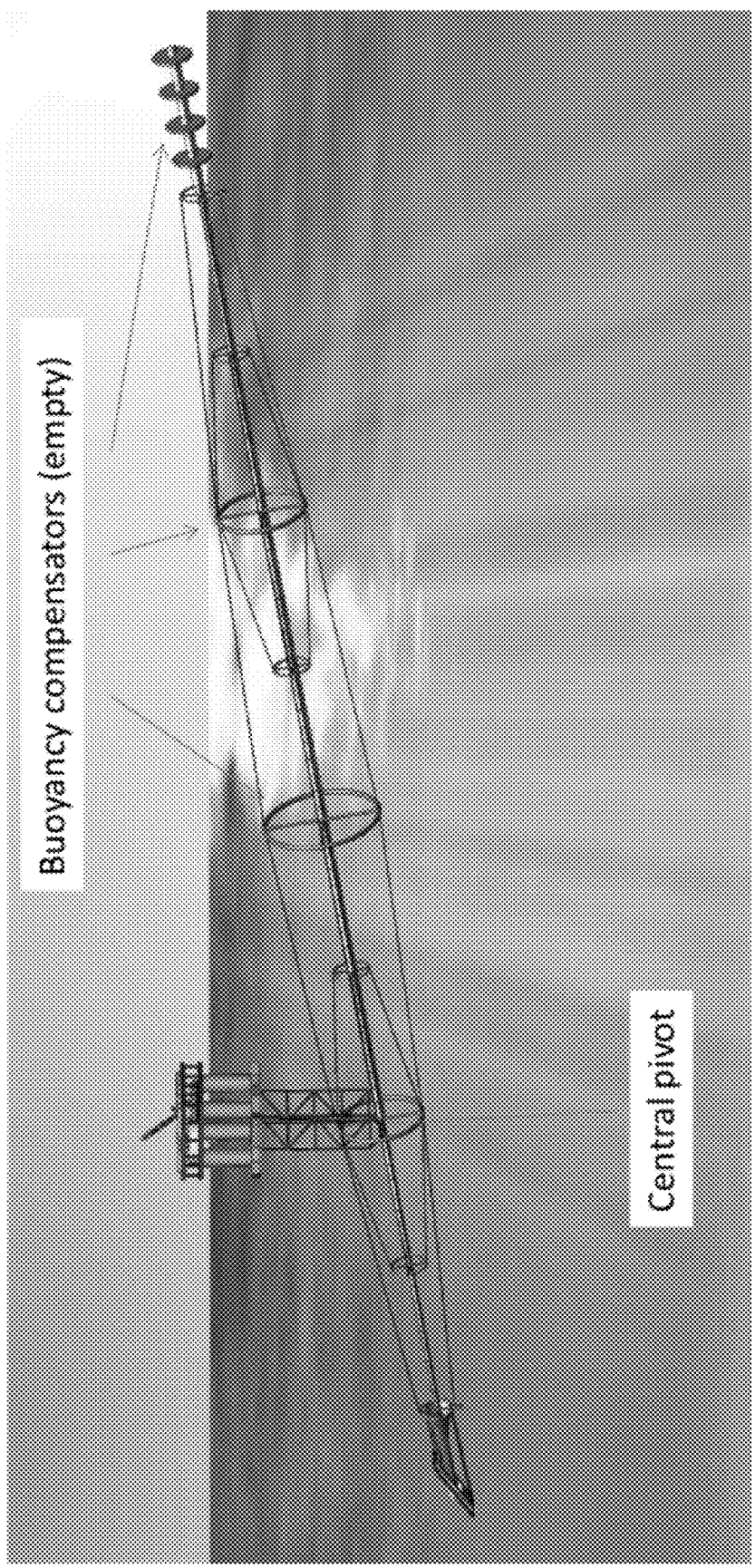
Figure 5. OBL with pump tube stowed for maintenance or transport

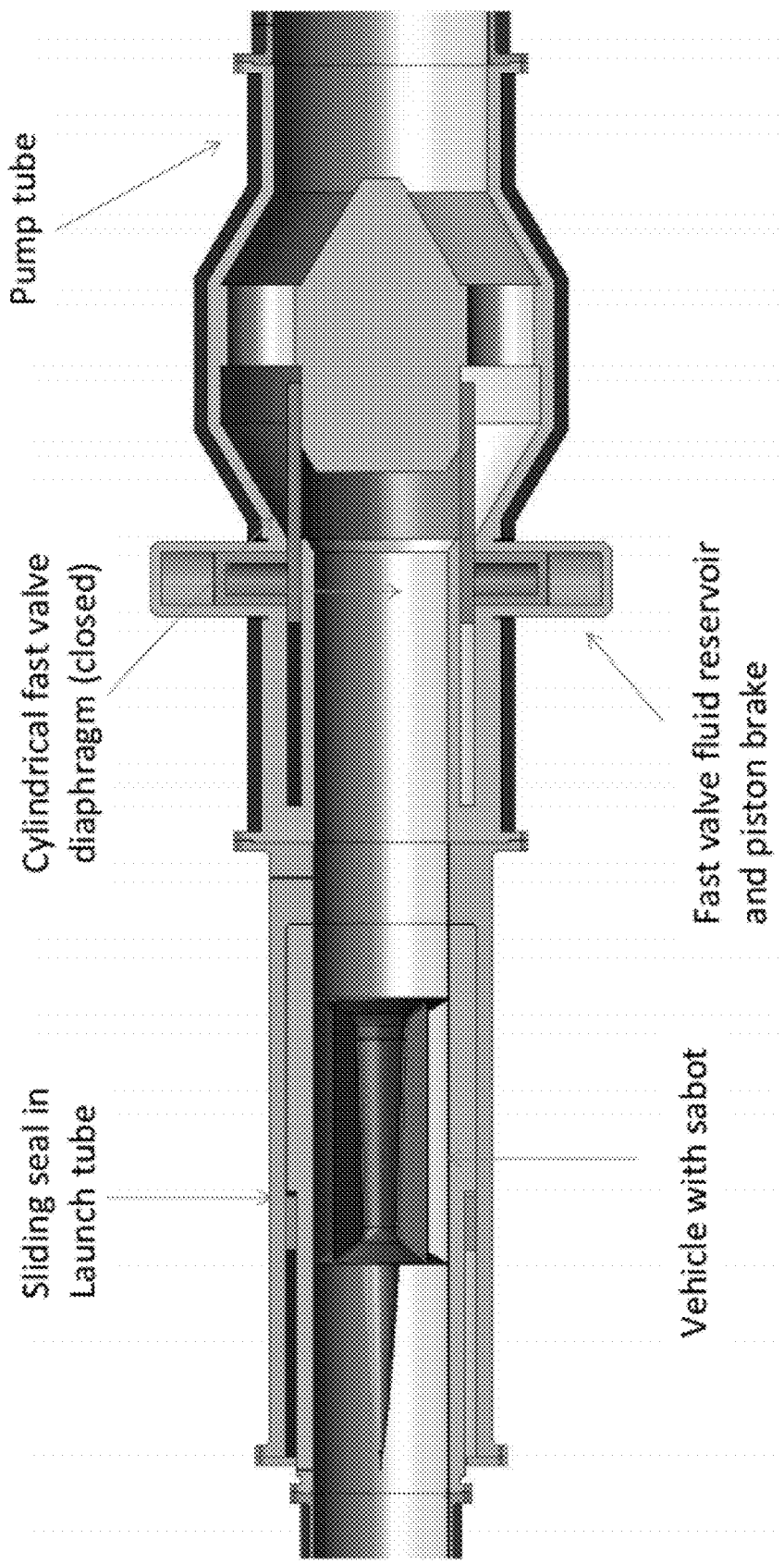
Figure 6. Vehicle pre-launch near sliding seal and forward of fast valve

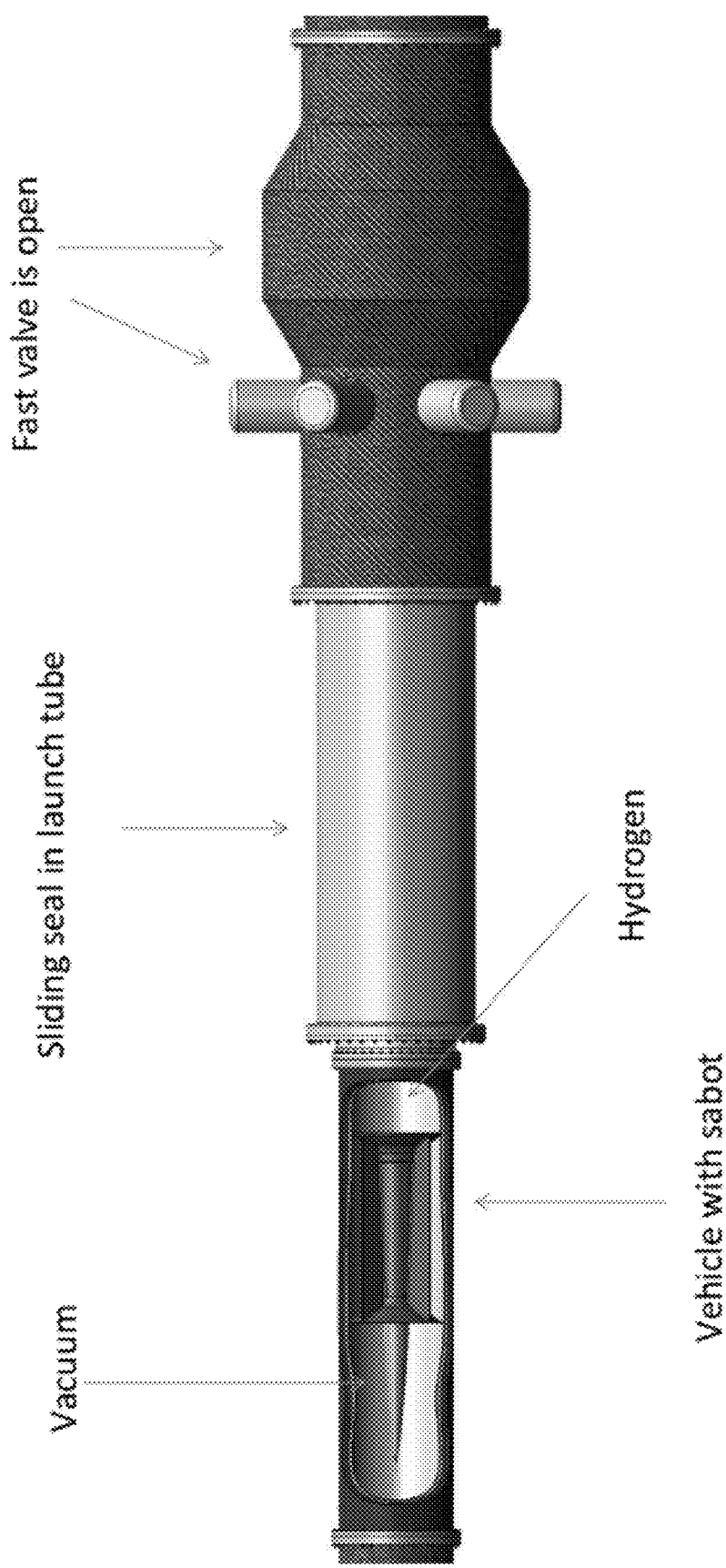
Figure 7. Cutaway showing vehicle accelerating during launch

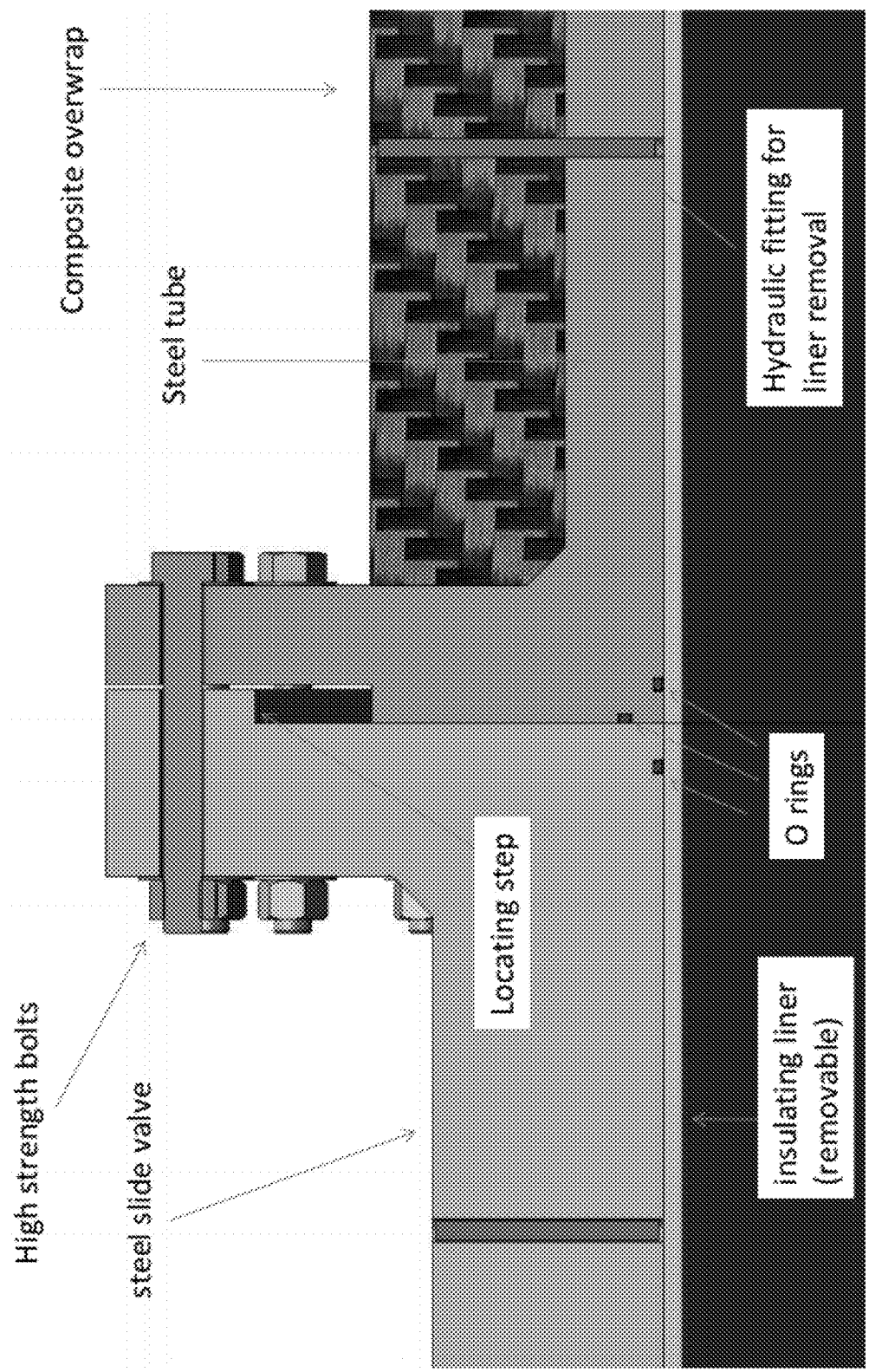
Figure 8. Flanges between sliding seal (L) and fast valve (R)

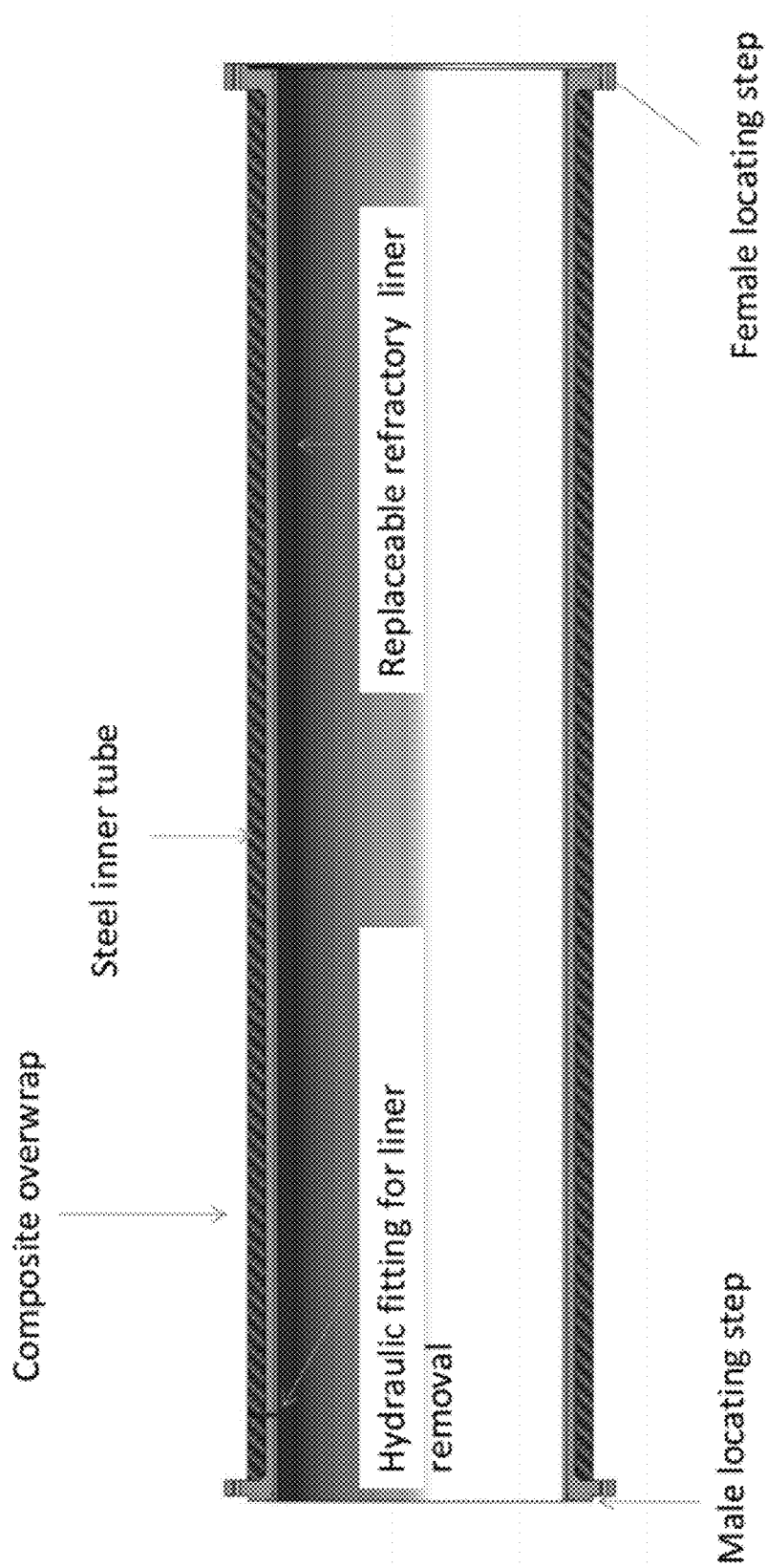
Figure 9. Composite launch tube (pump tube has insulating liner)

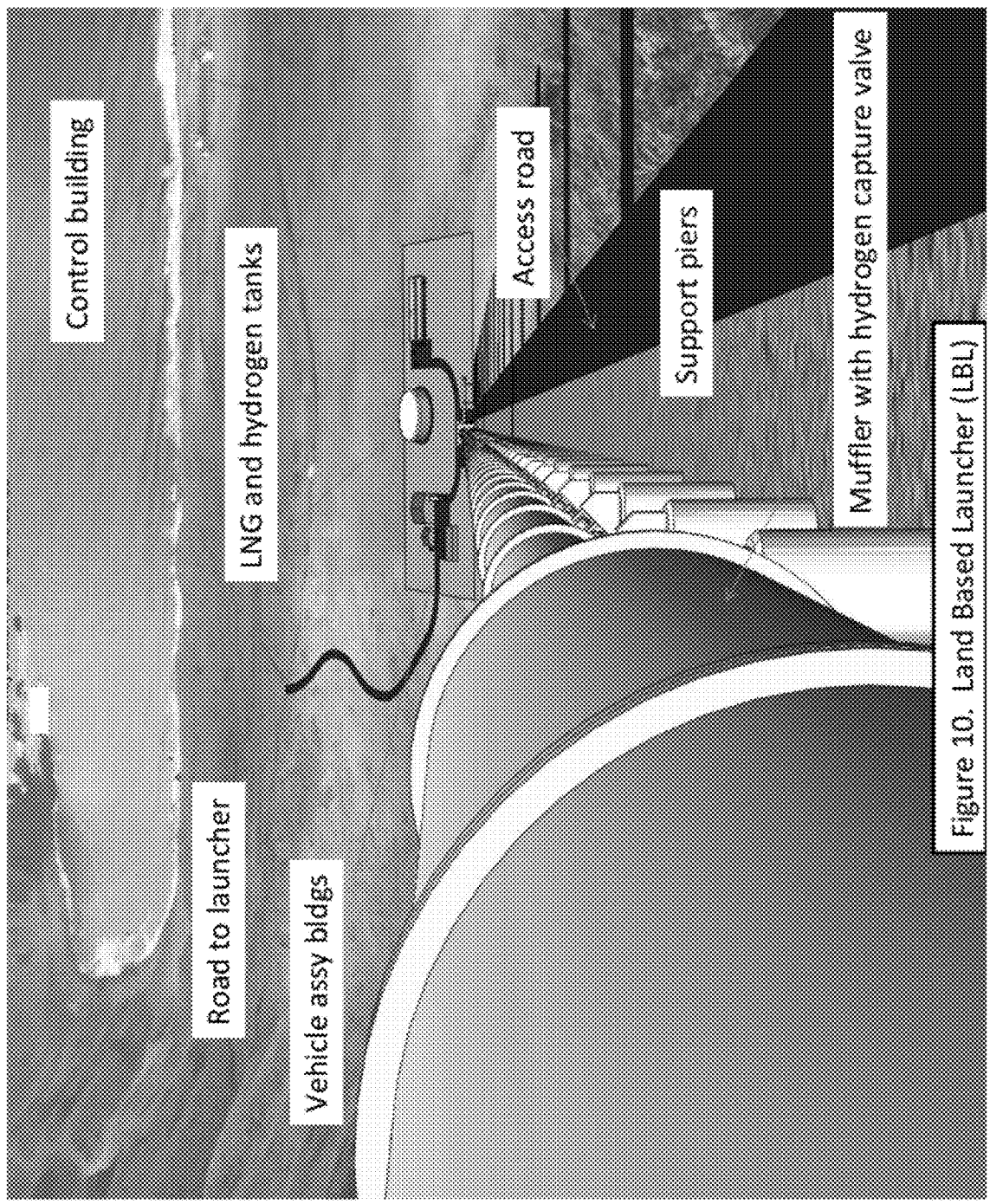

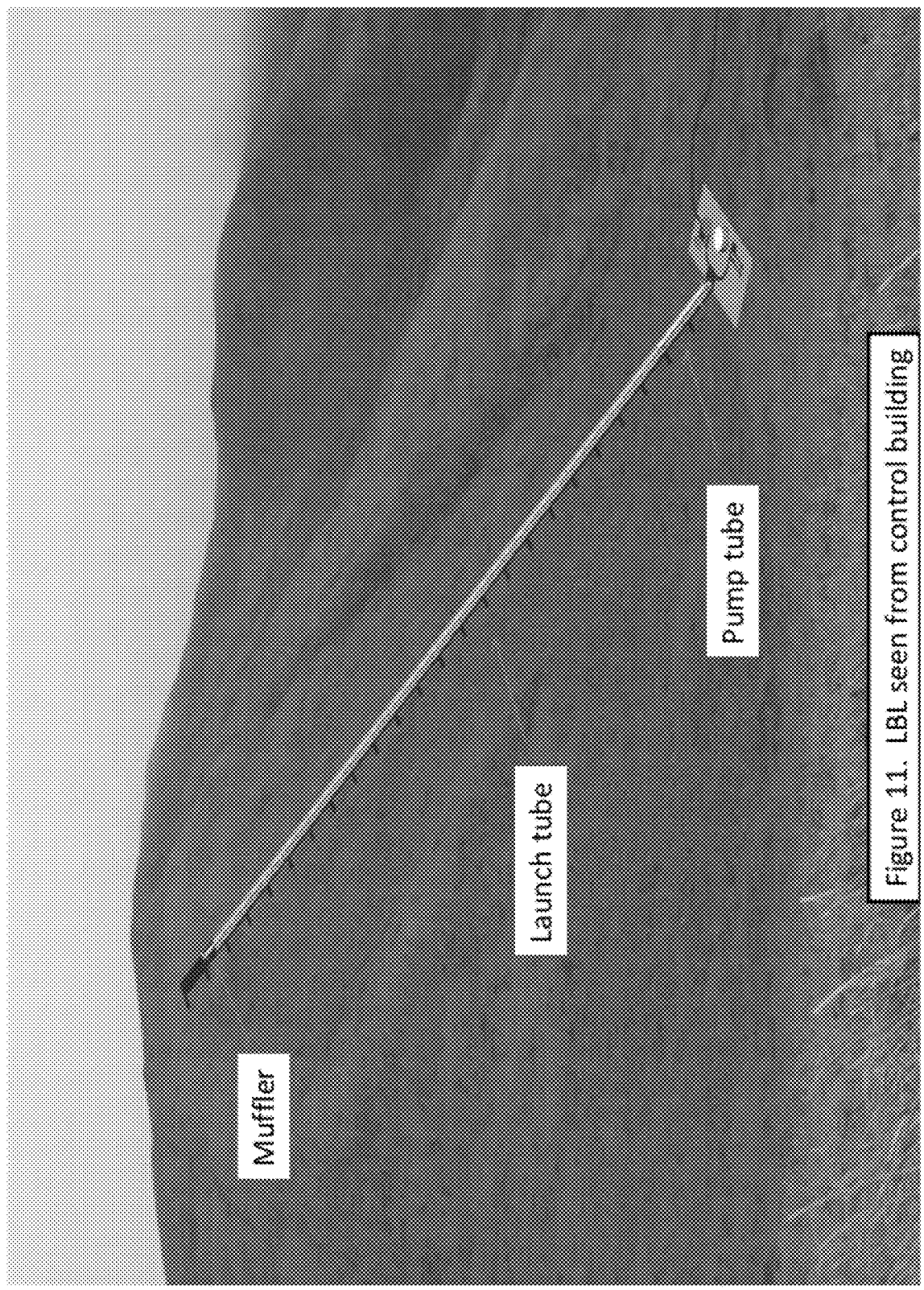
Figure 11. LBL seen from control building

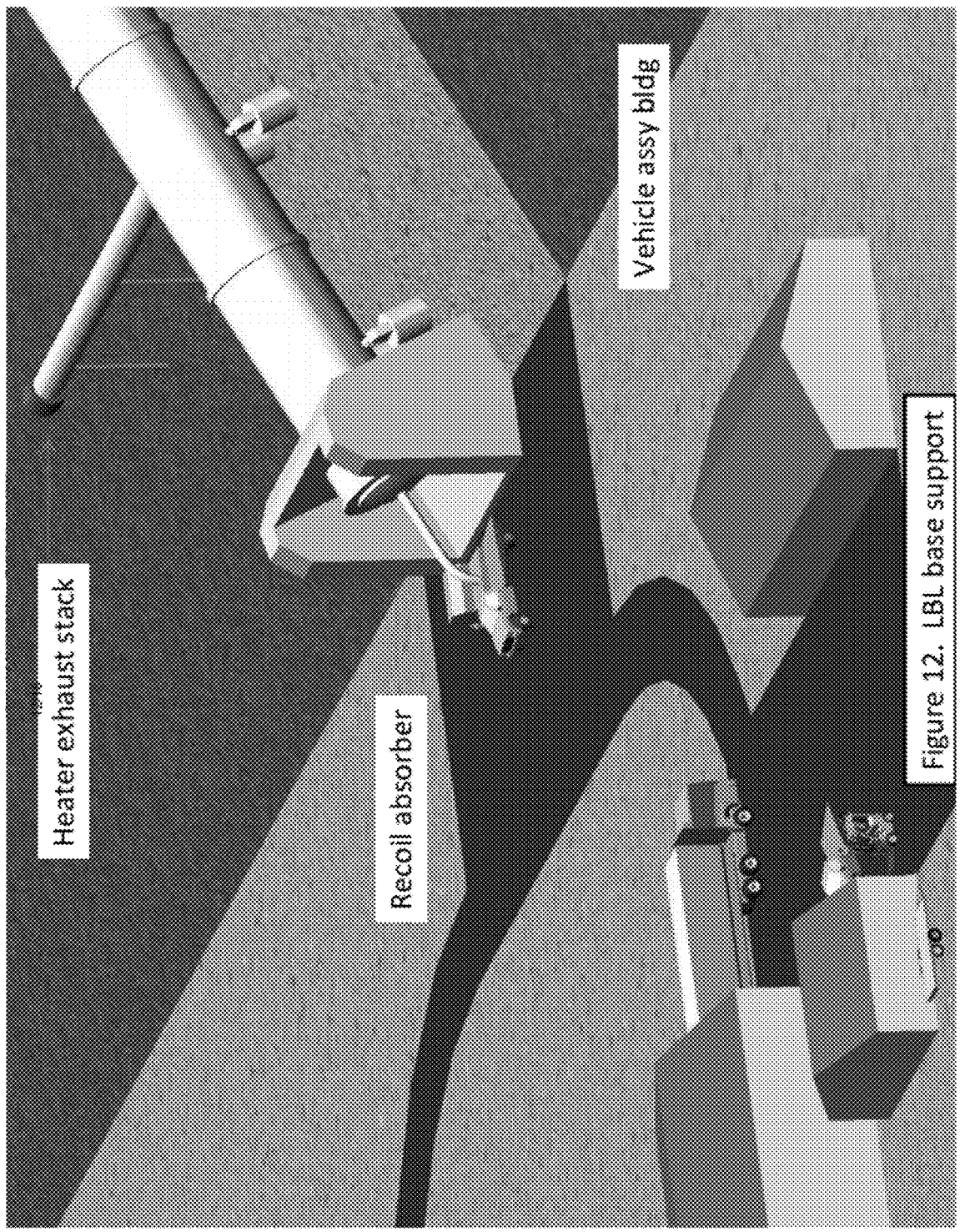

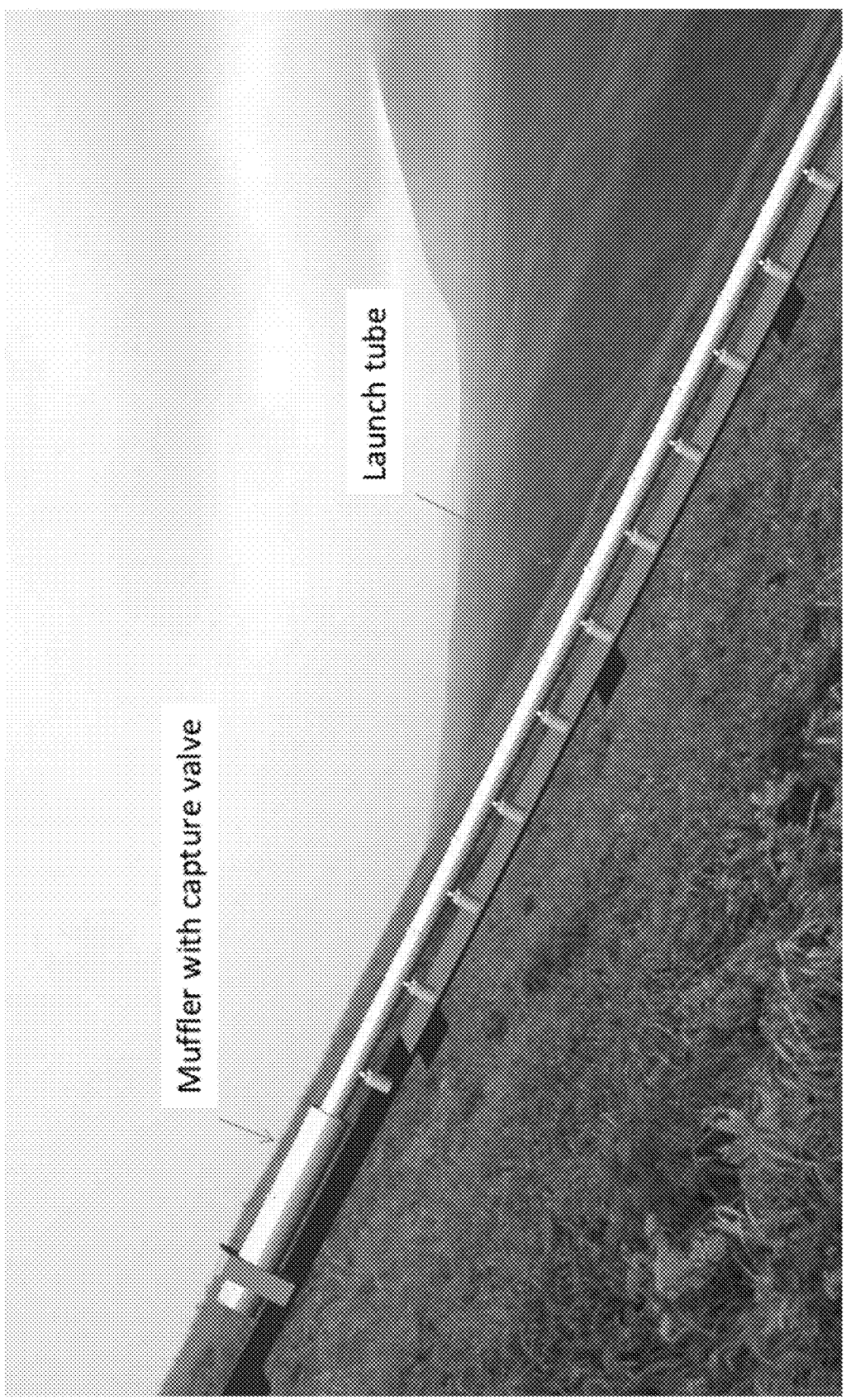
Figure 13. LBL side view

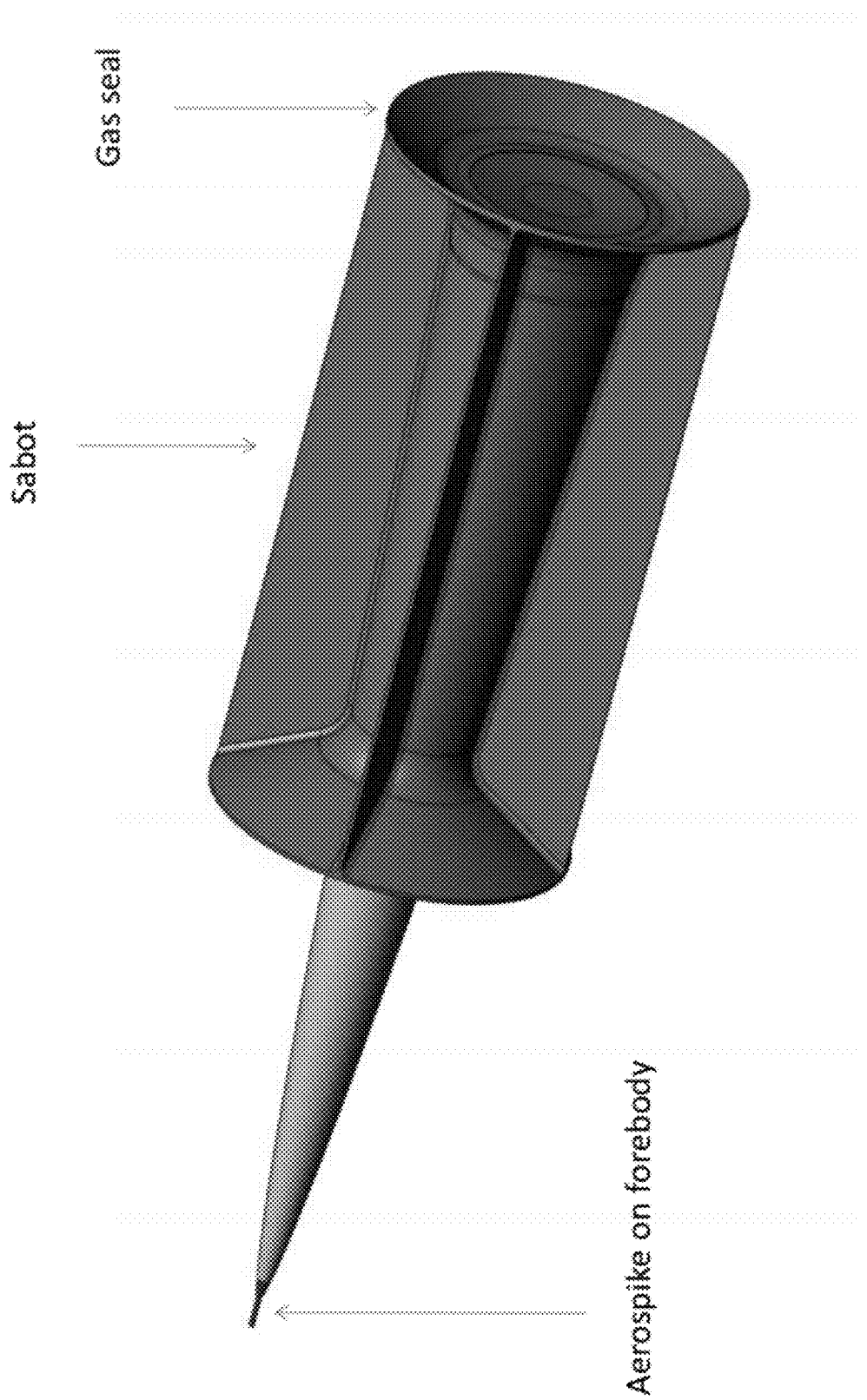
Figure 14. Vehicle with sabot

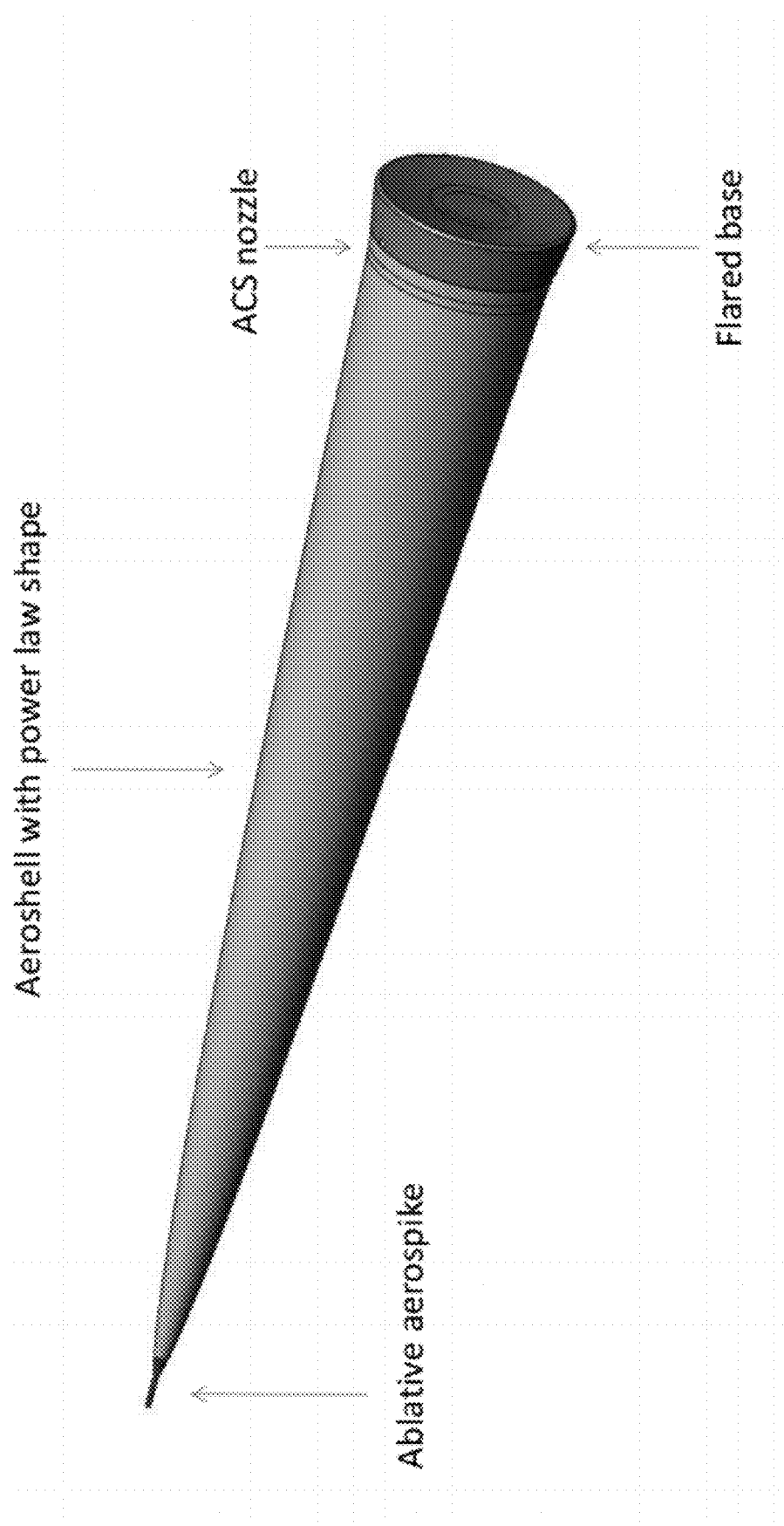
Figure 15. Vehicle aeroshell

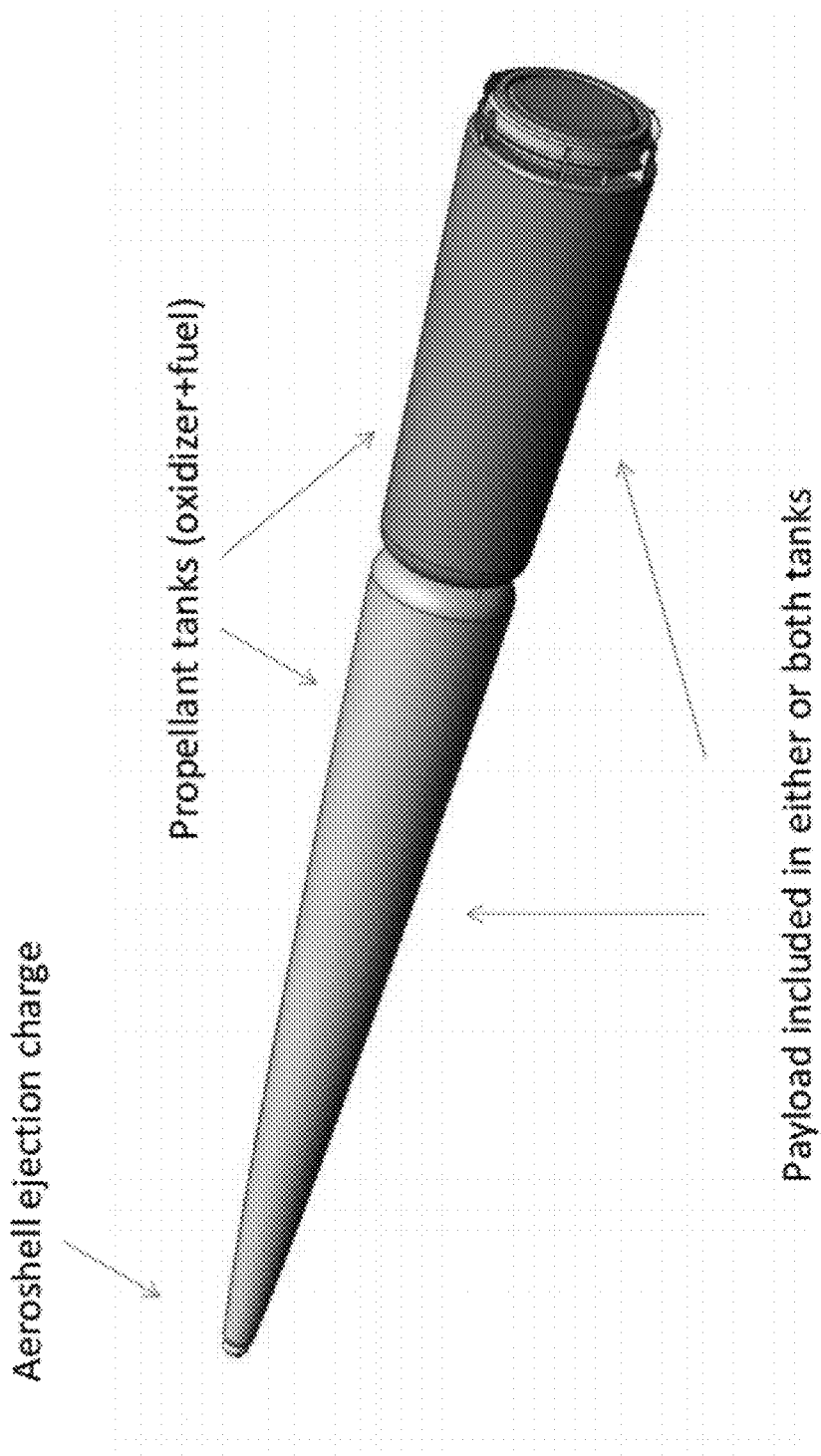
Figure 16. Rocket motor and payload

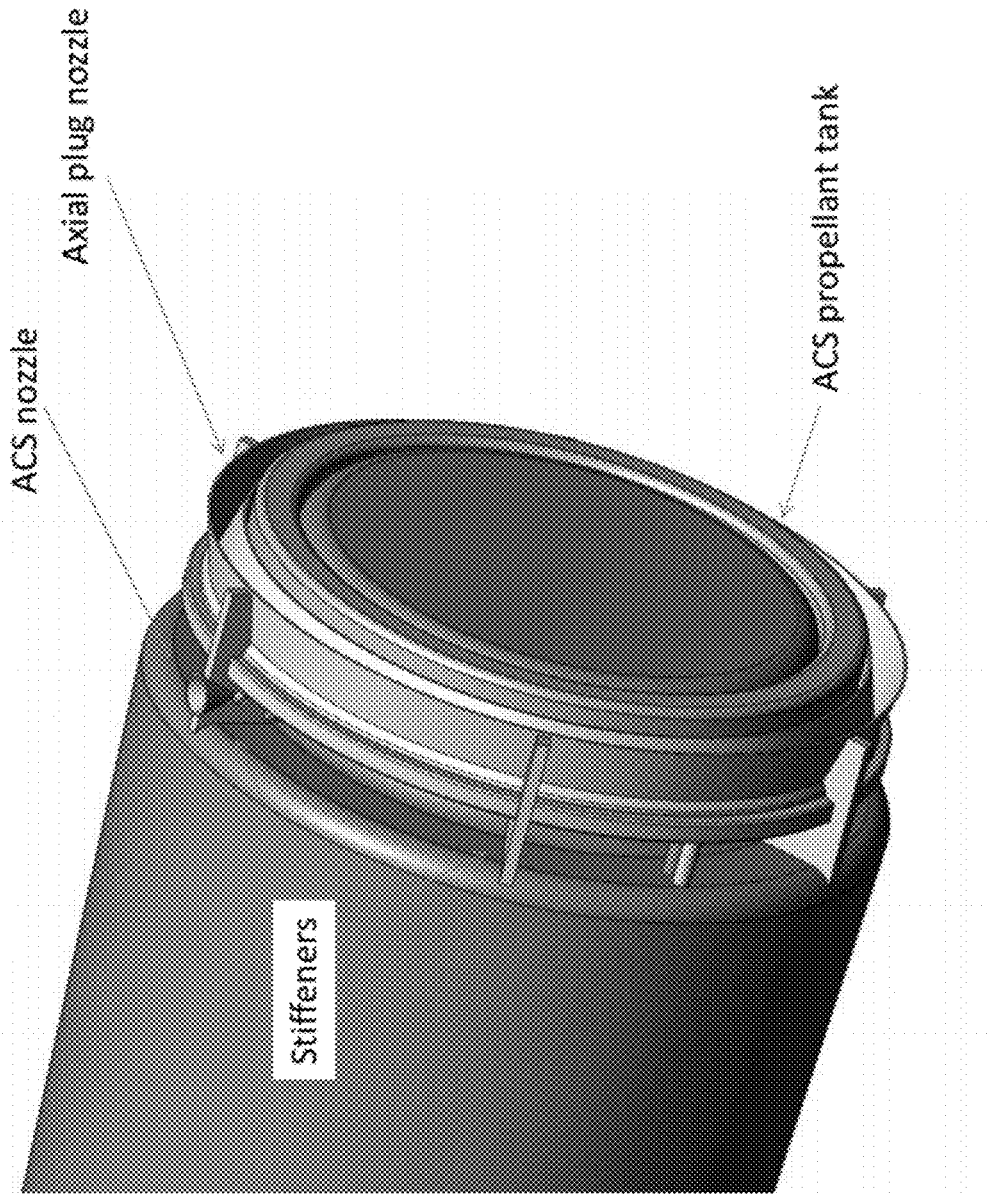
Figure 17. Rocket nozzle and Attitude Control System (ACS)

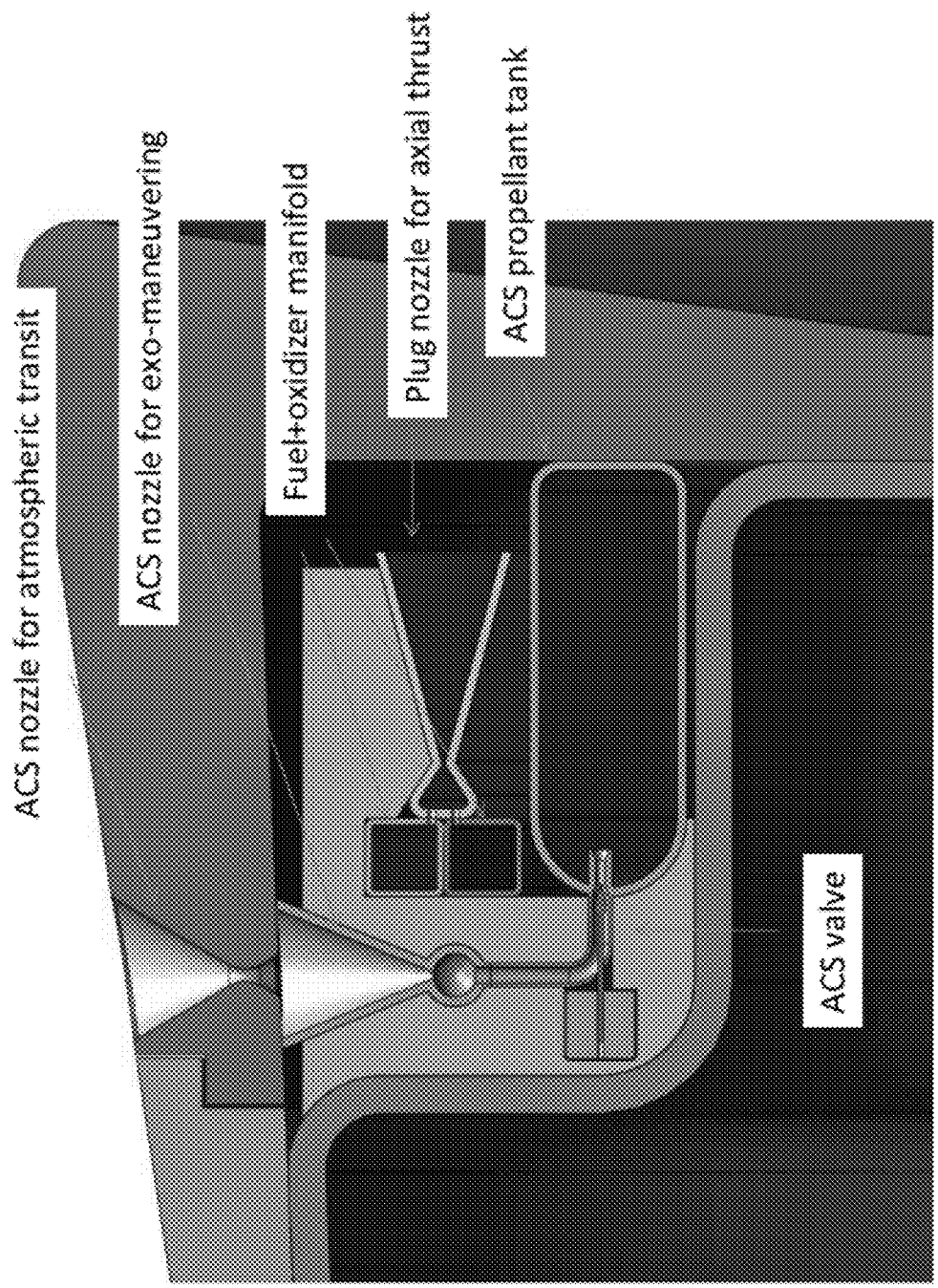
Figure 18. Close up of ACS and rocket nozzle

GAS GUN LAUNCHER

This application is a continuation of PCT/US2010/050437, filed Sep. 27, 2010 and entitled "Gas Gun Launcher," inventors John Hunter, Harry Cartland, Philip Sluder, and Richard Twogood, which claims priority to U.S. App. 61/277,544 and U.S. App. 61/277,543, each of which was filed Sep. 25, 2009. Each of the three preceding applications is incorporated by reference herein as if put forth in full below.

TECHNICAL FIELD

This invention relates to a gun which employs a heated gas to provide the initial acceleration for a projectile such as a missile which will subsequently produce initial acceleration by employing its own propulsion system, especially such projectiles that carry a payload into orbit.

BACKGROUND ART

An older version of a missile receiving initial acceleration from high-pressure air or another gas is the subject of U.S. Pat. No. 3,583,277.

United States patent application publication no. 20100212481 discloses "[a]n improved two-stage light gas gun for launching projectiles at high speeds. The gun consists of three tubes: the expansion, pump, and launch tubes. The expansion tube contains a close-fitting expansion piston that is propelled by an explosive charge. The expansion piston in turn drives the pump piston housed within the pump tube by means of a rod connecting the two pistons. The action of the pump piston adiabatically compresses and heats a light gas of hydrogen or helium, bursting a diaphragm at a predetermined pressure and expelling the projectile from the launch tube at a very high speed. This publication also quite well describes the prior art.

And U.S. Pat. No. 7,775,148 provides, "Launching payloads at high velocity uses high-pressure gas or combustion products for propulsion, with injection of high pressure gas at intervals along the path behind the payload projectile as it accelerates along the barrel of the launcher. An inner barrel has an interior diameter equal to the projectile diameter or sabot containing the projectile. An outer casing surrounds the inner barrel. Structures at intervals attach the outer casing and the inner barrel. An axial gas containment chamber (AGC) stores high pressure gas between the inner barrel wall, the outer casing wall, and enclosure bulkheads. Pressure-activated valves along the barrel sequentially release the high pressure gas contained in the AGC in to the barrel to create a continuously refreshed high energy pressure heads behind the projectile as it moves down the barrel. A frangible cover at the exit end of the barrel allows the barrel to be evacuated prior to launch. The launcher is rapidly recyclable. The valves close automatically after the projectile has exited the barrel, allowing a new projectile to be introduced into the breech and the AGC to be recharged with high-pressure gas."

U.S. Pat. No. 7,775,148, moreover, for one embodiment states, "The elongated projectile launcher barrel is supported by flotation collars near breech and muzzle ends and is erected by flooding a flotation collar near the proximal end and submerging the breech end."

And U.S. Pat. No. 6,116,136 uses recoil plates in an "actuated recoil absorbing mounting system" in order to "absorb the recoil energy from an underwater projectile launcher, such as a high discharge energy underwater gun."

In none of the preceding patents or any other patent of which the inventors are aware are the barrels, or tubes, buoyant; is the launch tube isolated from the pump tube; or is there an automatic alignment system.

The present inventors have developed a means of delivering supplies to earth lunar orbit in order to assist space exploration. The current method of delivering propellant, food and other supplies to orbit is with rocket delivery. Rocket delivery is extremely expensive with a typical cost of about $5,000 per lb of payload delivered. The requirement for approximately 9 km/s delta V to attain earth orbit when coupled with the rocket equation yields only a few percent payload fraction for rocket delivery. Their method uses a hydrogen gas gun to first boost a rocket to high speed. This allows a smaller more efficient rocket to deliver the payload to orbit. The payload fractions obtained are thereby much higher than obtained by a rocket alone. Their higher payload fractions plus the re-usable hydrogen gas gun reduce the payload delivery cost by more than a factor of 10.

The present inventors have previously described using hydrogen gas guns to deliver payloads to orbit in the following published articles: "Livermore Proposes Light Gas Gun For Launch of Small Payloads", *Aviation Week and Space Technology*, Jul. 23, 1990, pp. 78-80; "Shooting Right For The Stars With One Gargantuan Gas Gun", *Smithsonian Magazine*, January 1996, pp. 84-91; and "The Jules Verne Gun", Popular Mechanics, December 1996, pp. 54-57. These described the construction and performance of the SHARP (Super High Altitude Research Project) launcher at Lawrence Livermore National Laboratory as well as potentially larger follow-ons.

DISCLOSURE OF INVENTION

The gas gun launcher of the present invention, principally to prevent a tension wave from proceeding along the launch tube and thereby degrading the accuracy of a launch, uses a sliding attachment of the launch tube to the pump tube with a sliding seal to retain the gas within the launch tube and the pump tube.

A launch tube alignment system is preferably automatic, again to enhance the accuracy of launches.

And an embodiment of the gas gun launcher suitable for use in water such as an ocean or large lake preferably utilizes a neutrally buoyant launch tube and a neutrally buoyant pump tube.

The current invention focuses on both land and ocean based hydrogen gas guns. Both the Land Based Launcher (LBL) and the Ocean Based Launcher (OBL) provide the following:

1. Obtain vehicle muzzle velocity commensurate with orbital speeds with the launcher. The advantage of using hydrogen is that it has $\frac{1}{10}^{th}$ the molecular weight of gunpowder and this manifests itself in a much higher sound speed by comparison. The fundamental velocity of any gas based gun is:

$$U_{max}=2*C_0/(\text{Gamma}-1) \quad \text{(Eqn. 1)}$$

(Where $C_0$ is the initial sound speed and Gamma is the specific heat ratio.)

Eqn. 1 is the basis for the fact that the world record for powder guns is 3 km/s while the record for hydrogen guns is 11.2 km/s. The speeds associated with attaining LEO at 500 km altitude are well matched to hydrogen guns. One has:

Uorbit=7.6 km/s

DeltaUorbit=9.0 km/s

2. Use piston-less hydrogen gas guns to reduce the amount of velocity needed by a rocket to provide payload to orbit. Eliminating the piston reduces the recoil momentum and size of the launcher.
3. Minimizing the carbon footprint and pollution by using natural gas to heat the hydrogen. This is much cheaper, cleaner and safer than the gunpowder used to propel the piston in a conventional two-stage hydrogen gas gun.
4. Decouple the recoil from the launch tube thereby eradicating launch vibration and allowing a lighter, lower inertia launch tube. Traditional gas guns have very heavy thick walled launch tubes since they see extreme vibrations during the shot. The high velocity nature of hydrogen gas guns demands a static launch tube during the shot. Otherwise the vehicle will be damaged by the transverse g-loads as it traverses the launch tube. Our pump tube slides backwards with a sliding seal between itself and the launch tube thereby preventing launch tube recoil.
5. Align the launch tube automatically. Launch tube alignment is critical for high velocity guns and must be performed before every launch. It can be an onerous and expensive task when performed by surveying crews. Automatic alignment will reduce O&M costs and save time.
6. Have a fast opening valve that tailors the pressure profile at the projectile as it traverses the barrel. This allows a lower peak G-load on the projectile. Typical single stage gas guns have maximum pressure occurring near the breech and this causes very high initial G-loads. Conversely two-stage piston driven gas guns have lower peak pressures at the expense of a massive piston. The valve of the present invention initially allows modest hydrogen release until the vehicle is a decent fraction (say ⅓) of the way down the launch tube. The valve having opened more by then, allows the peak pressure to occur.
7. Have a fast closing muffler to capture the majority of the hydrogen and allow the hydrogen to be recycled. This reduces launch costs and reduces muzzle blast as well.
8. Have a mechanism to impart spin to the vehicle. The advantages to the vehicle include greater flight stability, lower peak stress and heating and the ability to use a novel, single thruster Attitude Control System (ACS).

The Ocean Based Launcher (OBL) has unique objects and advantages that distinguish it from the LBL systems described here and in the references. The objects and advantages include:
1. High mobility since the OBL may be towed and deployed in any preferred ocean including international waters. Mobility results in flexibility compared to both standard rocket systems and LBLs which are often constrained in launch inclination.
2. Agility in azimuth and launch angle allows launch access to all orbital altitudes and inclinations in the same day. For example a single OBL can launch several tons to a propellant depot at equatorial azimuth, 25 degree launch angle and 500 km altitude in the morning. It can then rotate to a 60 degree launch angle and deliver several tons to a depot at a geosynchronous altitude and inclination later on the same day.
3. Neutral buoyancy reduces launch tube gravitational sag to near zero. This means the launch tube can be very straight and will require less adjustment and fewer stiffeners. An extremely straight launch tube is paramount to minimize side loads on the launch vehicle. Neutral buoyancy also means the system is much lighter, potentially cheaper and more easily transported than an all steel system.
4. Immunity to seismic activity. Some land-based systems may be located near regions of earthquake activity and active faults. The OBL will be immune to seismic activity. It will obviously have to deal with potentially energetic wave action. Tsunamis are expected to be of small consequence since their amplitude is low in deep waters.
5. Range safety is much easier since the launch location will be away from populated areas with an ocean downrange.
6. Hurricane avoidance is easily managed by deploying the OBL within 5 degrees of the equator where hurricanes don't occur. (The Coriolis Force that organizes hurricanes is proportional to the sine (Latitude).

The launch vehicle has the following objects and advantages:
1. It has a sabot as shown in FIG. 14 that allows a larger working area for the hydrogen pressure. This gives the vehicle greater velocity for a given hydrogen pressure.
2. It has a sacrificial aero-spike at the nose to reduce the heat transfer on the forward part of the vehicle. The aero-spike will ablate several inches during atmospheric flight. The advantage is the aero-shell fore-body is substantially away from the high speed air stagnation point at the aero-spike tip and hence will not heat and ablate excessively.
3. It preferably spins about the long axis thereby averaging out aerodynamic moments and heating. This reduces peak bending forces and hot spots.
4. It preferably has an Attitude Control System (ACS) that only requires one nozzle. This works in conjunction with a spinning vehicle and an intelligent controller. The advantage is a much lower part count and weight than a traditional ACS which usually has multiple nozzles.
5. It preferably has propellant tanks that can carry both the propellant and the payload. This is because the payload is often rocket propellant such as $LH_2$, LOX or RPl, while the vehicle uses the same propellant. This will reduce the part count and weight of the vehicle.
6. It preferably has a plug nozzle. The advantage is a much shorter, compact nozzle than a conventional central nozzle. This will increase ruggedness under the high G launch loads. It will also allow for a more compact and lighter vehicle.
7. It preferably has a centripetal fuel pump based on vehicle rotation. The rapidly spinning vehicle can generate significant hydrostatic propellant pressures at the periphery of the propellant tanks. Propellant can then be fed through a pressure regulator to the plug nozzle. The advantage is in eliminating a turbo-pump or pressure bottle that is ordinarily used to pressurize the propellant. This will save weight and reduce cost.
8. It preferably has liquid propellant comprised of an oxidizer and a fuel. One advantage is no in-bore detonations in the event of vehicle break up in the launcher. Other advantages include higher specific impulse as well as the ability to throttle thrust.

BRIEF DESCRIPTION OF DRAWINGS

FIG. 1 shows an Ocean Based Launcher (OBL) from the side.
FIG. 2 shows the OBL muffler and its maintenance platform.
FIG. 3 shows the muffler recoil mechanism and both maintenance platforms.
FIG. 4 shows the submerged pump tube.
FIG. 5 shows the OBL in stowed position.

FIG. 6 shows a cutaway view of the vehicle near the sliding seal and fast valve.

FIG. 7 shows the vehicle accelerating during a launch.

FIG. 8 shows the flanges between the sliding seal and fast valve.

FIG. 9 shows a section of composite neutral buoyancy launch tube.

FIG. 10 shows the Land Based Launcher (LBL) as seen from the muzzle.

FIG. 11 shows the LBL seen from the control building.

FIG. 12 shows the LBL base support.

FIG. 13 shows the LBL launch tube side view.

FIG. 14 shows the launch vehicle with sabot.

FIG. 15 shows the vehicle aero-shell.

FIG. 16 shows the rocket motor and payload.

FIG. 17 shows the rocket nozzle and ACS.

FIG. 18 shows a close up of the ACS and rocket nozzle.

MODES FOR CARRYING OUT THE INVENTION

A pump tube shown in FIGS. 1, 4, 8 and 12 is comprised of flanged sections is made from steel tubing with high strength composite fiber overwrap. The thickness ratio of composite to steel is tailored to achieve neutral buoyancy. We note that typical composites have densities of about one fifth that of steel while they are very strong in tension. Since the composite is only strong in the fiber direction, one will typically employ a winding angle to give the tube both hoop strength as well as longitudinal strength. In our example case of 15 ksi internal pressure we used about six inches of Toray graphite composite wrapped around a 3 inch thick high strength steel tube, with a 100 inch ID. This recipe gives a safety factor of approximately 3 on yield assuming 15 ksi internal pressure.

The OBL preferentially uses the neutral buoyancy tubes submerged in the ocean to minimize gravitational loads and hence tube distortion. The LBL has the option to use composites as well and in this case benefits from the reduced weight, distortion and cost. The pump tube also has an insulating liner that reduces hydrogen heat transfer to the walls. The pump tube contains a heat exchanger that uses the heat of combustion of natural gas and air to heat hydrogen.

The pump tube has buoyancy compensators, in the case of the OBL, that also serve as recoil fins as in FIG. 4. The compensators have sufficient area to dampen the pump tube recoil after a motion of several meters. There may be prior art regarding the recoil fins and if so we will use conventional shock absorbers that loosely couple the launch tube to the pump tube.

The pump tube has a gas manifold shown in FIG. 4. The manifold has remote valves and sensors that allows for the addition of hydrogen as well as pulling a vacuum or purging with air or another gas. The manifold also admits natural gas and air destined for the heat exchanger and allows venting of the heat exchanger exhaust products. The heat exchanger is located in the bottom of the pump tube and the heated hydrogen will rise and have some stratification with the hottest hydrogen nearest the launch vehicle which is in the first section of launch tube. The stratification is beneficial since the high temperature and hence sound speed occurs nearest the vehicle where it will produce a higher speed than with no stratification.

A reusable high speed opening valve is located in the pump tube near the sliding seal in the launch tube as shown in FIGS. 6 and 9. The valve diaphragm is initially clamped in the closed position by the force exerted by the radially oriented hydraulic pistons. When hydraulic pressure is released the diaphragm opens rapidly enough to allow the hydrogen to push the vehicle at high speeds down the launch tube. (Optional technology to the hydraulic pistons includes, but is not limited to, piezoelectric devices and squibs.) When the valve is initially opening, some hydrogen gas is released such that the vehicle accelerates yet doesn't see peak pressure until about ⅓ of the way down the launch tube. This reduces the peak stress on the vehicle. A sliding seal shown in FIG. 6 is located between the opening valve and the launch tube on the OBL to retain the gas since the launch tube slides into the pump tube, rather than being connected to the pump tube, in order to decouple and thereby prevent a tension wave at launch from traveling to the launch tube and interfering with the accuracy of the launch when the pump tube recoils from the launch tube. Prevention of the tension wave in the OBL is further aided by the recoil fins/buoyancy compensators. The LBL can instead have the base of the pump tube coupled directly into the reinforced concrete structure (see recoil absorber in FIG. 12). If necessary, when the concrete structure is used as a shock absorber, the LBL pump tube can have a sliding seal similar to the OBL. Having a sliding connection and shock absorber system (recoil fins or recoil absorber), furthermore, aids in preventing separation of the launch tube from the pump tube.

The valve accelerates prior to opening and the flow area increases from zero to full area in a short time thereafter. By tailoring both the shape and mass of the cylindrical diaphragm as well as the empty volume behind the vehicle, one can insure that peak pressure at the vehicle base occurs when the vehicle is at a desired location. (About ⅓ of the way along the pump tube is much better in terms of reducing peak G-load.)

The cylindrical fast valve diaphragm is illustrated in FIG. 6. The inventors have built this version and indicate that it works well. The way it works is the hydrogen acts on the rear edge to push it to the left. Upon the release of the fast valve piston brake (FIG. 6) the item accelerates via $Mdv/dt=P*A$. The hydrogen starts to flow once the item has moved past the interior male part. The flow rate is set by the increasing flow area as well as the volume behind the projectile. There is a finite fill time for the hydrogen pressure to ramp up behind the projectile. Meanwhile as the hydrogen pressure is rising, the projectile starts to move and then one sees essentially unsteady 2-D gasdynamic flow. A person of ordinary skill in the field of gasdynamics can run a 2-D gasdynamic code like Fluent and readily dial the parameters (item mass, shape, distance item must accelerate before hydrogen starts to release, initial volume behind the projectile) to obtain the desired feature of where the pressure peaks at the projectile.

The launch tube is constructed similarly to the pump tube however it has a replaceable refractory liner. Straightness is at a premium here since the vehicle is traveling at high speeds. Waviness in the OBL and the LBL launch tubes is reduced by means of an automatic launch tube alignment mechanism which senses misalignment. The OBL waviness will then be corrected by differential tension applied to the cables shown in FIGS. 1, 3 and 5. The LBL will instead use threaded actuators to align the launch tube.

Both the OBL and LBL can use similar sensors to determine misalignment. Ludeca offers a commercial laser/optical device to determine misalignment. (See www.ludeca.com/prod_borealign-bore-alignment.php.) The inventors' preferred method has three precision tubes rigidly attached externally to the launch tube. The Ludeca bore alignment devices are located inside the tubes and sense misalignment as described in their brochure. Alternatively the devices can travel inside the launch tube prior to the launch.

Once misalignment is determined the OBL can apply tension to the tensioning cables shown in FIG. 1. The amount of tension per cable will be a determined from a lookup table based on previous calibration testing of the launcher alignment. Screw type actuators will either tension or relax the tension members.

The LBL alignment forces are applied in a different fashion from the OBL due to the simple piers attached to the earth (FIGS. 10-13). The inventors align the LBL launch tube mechanically using two set screws per pier giving X and Y displacement (Z is the barrel direction) This is the same method employed on SHARP (Super High Altitude Research Project) at LLNL.

In both the OBL and LBL cases alignment sensing and adjustment will be carried out remotely with the help of a "Labview", "Trio" motion control system or a standard PLC (Programmable Logic Controller). Preferably, a human confirms final alignment prior to each launch.

Circular cable support members shown in FIGS. 1 and 5 are distributed along the OBL launch tube. These help stiffen the launcher. They are hollow and, as do the recoil fins/buoyancy compensators, also provide buoyancy compensation as needed. (One of ordinary skill in the art would know how to adjust the air/water ratio in the circular cable support members and in the recoil fins/buoyancy compensator as necessary to achieve the desired buoyancy.)

The male locating step and female locating step in FIG. 9 assist in more accurately joining and aligning the launch tube and the pump tube than can be accomplished by placing bolts in the pattern of apertures on the flanges of the launch tube and the pump tube.

The composite construction muffler in FIGS. 2 and 3 is larger in diameter than is the launch tube. It is connected to the end of the launch tube by a sliding seal. There is at least one fast-closing valve in the muffler, discussed more below, that captures the hydrogen after the vehicle has exited the launcher. Shock absorbers are attached to the muffler and the launch tube preferably near the sliding seal. They absorb the hydrogen forward momentum at the muzzle allowing the muffler to recoil forward without sending a tension wave down the launch tube and thereby altering the alignment of the launch tube as well as the accuracy of the launch.

Maneuvering thrusters shown in FIGS. 3 and 4 are attached at least to the fore and aft cable support members of the OBL. These thrusters allow the operator to maneuver the OBL.

There is preferably a Maintenance Platform (MP) as shown in FIG. 3 that is constructed similarly to a free floating oil platform. The MP is connected near the center of the OBL with a bearing attached to the launch tube. The bearing allows rotation of the launch tube about a horizontal axis. The MP contains the LNG and hydrogen tanks as well as vacuum pumps, compressors and electrical power and generators. The MP also has a control room with radar, communications, crew quarters, a cafeteria and a sick bay. It also has a helipad and a vehicle storage and assembly building. A ship or floating platform could, however, also accomplish the functions of the MP.

There is, also preferably, a smaller Muffler Maintenance Platform (MMP) shown in FIG. 2 that is attached to the launch tube but not attached to the muffler. The MMP has a helipad and a work area complete with an automated vehicle loader. There is also a combination launch tube inspection device and hone. Again, though, a similarly equipped ship or floating platform could accomplish the functions of the MMP.

As a theoretical example, a launcher could have a pump tube with an internal diameter of 4 meters and a total length of 100 meters. It would be joined to a launch tube 1,000 meters long with an ID of 2.5 meters. The muffler at the end of the launch tube would be 5 meters in internal diameter and 50 meters long. The heated hydrogen just prior to the shot would be at 15 ksi and 1,700 Kelvin. The launch vehicle would weigh about 3 tons and deliver 1,000 lbs of payload to a depot in equatorial low earth orbit.

The launch vehicle, illustrated in FIGS. 6 and 14, has a sabot that encloses the aero-shell and gives it an effectively larger area. The sabot is preferably composed of at least two petals, even more preferably of two to six petals, and most preferably of four petals. The petals are a composite or aluminum and fall off of the aero-shell when the vehicle emerges from the launcher and encounters aerodynamic forces.

The aero-shell preferably has a power law shape of the form $r=AX^P$ where the exponent is 0.75, although other viable shapes such as bi-conic exist. The acceptable range of exponent is, though, between 0.25 and 1.5, inclusive. The length to diameter ratio L/D is between 3 and 20, exclusive of the endpoints. An L/D of 5 has about 4 times the drag of an L/D of 10. The reason for excluding L/Ds greater than or equal to 20 is the fragility of long skinny objects at extreme speeds in air. Conversely, an L/D of 1, will be rugged but have unacceptably high drag.

The aero-shell covers the housing of the vehicle without, of course, blocking the rocket motor nozzle, and is composed of carbon-phenolic or similar and has a wall thickness appropriate to the in-bore stresses it will experience. (Carbon-phenolic is a name known by one of ordinary skill in the field of thermal protection for aircraft and reentry bodies.) In-bore stresses are a result of base pressure, velocity, barrel straightness, and vehicle/sabot material. Those of ordinary skill in the art who design vehicles, e.g., designers for the light gas gun at AEDC in Tennessee, use computer FEA (Finite Element Analysis) predictions to design hypersonic gun-launched vehicles based on those properties. In addition to using computer programs to determine wall thickness, it is desirable to take data from a large number of test launches to validate and augment the FEA results.

The fore-body is preferably capped with an ablative aero-spike as illustrated in FIG. 15, although other nose-protection schemes don't use an aero-spike but accept a certain level, such as 5 to 10 inches, of nose ablation. And optionally the nose is cooled by transpiration, wherein a fluid such as water is forced through holes in the nose of aero-shell and other areas where thermal protection is desirable. The aero-spike is made of a rugged high Q* material like carbon-carbon or oak. It is approximately 1" in diameter and 10 inches long. (Aero-spike length varies depending on vehicle size and velocity. For the figures given here the inventors have assumed a 1-meter diameter aero-shell and a velocity of 6 km/s).

Qstar refers to the heat of ablation of a material under extremely high heating rates consistent with orbital speeds. Carbon-Carbon is known to those of ordinary skill in the field of thermal protection for re-entry vehicles. For example, Teflon, Carbon-Carbon, and oak are among acceptable ablative TPS (Thermal Protection System) materials. Carbon-Carbon has a Qstar in excess of 5,000 Btu/lb or 1.2e7 joules/kg. PICA (Phenolic Impregnated Carbon Ablator) and PICA-X are recent acceptable coatings used by NASA and Space X.

Aero-spike dimensions and length can be computed by the use of ablation codes such as Coyote and ABRES (ASCC86) at Sandia National Laboratories. Don Potter at SANDIA's Aeroscience and Compressible Fluid Mechanics Department, has run his shape changing ablation codes for the inventors in the past to predict the shape of an ablated vehicle nose. This is a straightforward yet challenging piece of engineering. There will be some trial and error. There are probably several hundred individuals of ordinary skill in the field at SANDIA, LLNL, Los Alamos, NASA, and assorted companies like SpaceX, Boeing and Lockheed who can perform the work. There will be some testing required in addition to the simulations.

The aft section of the vehicle preferably has a flared base in order to move the center of pressure rearward to increase stability. An ACS (Attitude Control System) nozzle, shown in FIG. 15, is preferably near the base in order to help provide stability during atmospheric transit. In addition, subtly canted (preferably less than five degrees with reference to the longitudinal axis of the vehicle because of the extreme speeds, heating rates, and dynamic pressures experienced by the vehicle in the atmosphere) fins are optionally present near the base to provide spin.

An aero-shell ejection charge, illustrated in FIG. 16, is located near the tip of the vehicle. Timing can be determined by an on-board accelerometer that determines when the vehicle has obtained approximately 60 to 100 km altitude or more. The first actuator is shown at the nose in order to push the motor and payload out of the hot aeroshell. There will be other actuators including exploding bolts and cutting charges required to sever internal structures to free the motor and payload from the aero shell. These other actuators will be fired prior to the actuator on the nose which ejects the motor and payload.

When the vehicle is powered by a solid propellant, a cargo compartment will exist. This is also an option when the vehicle uses liquid propellant.

More commonly, however, if liquid propellant powers the vehicle, the vehicle contains an oxidizer tank and a propellant tank, as illustrated in FIG. 16, with at least one tank being oversized to carry additional oxidizer or additional propellant as cargo. Instead of or in addition to, an oversized tank, a third tank optionally exists in order to carry liquid cargo other than an oxidizer or propellant, such as water or xenon.

A standard liquid propellant is most preferred, a hybrid fuel is preferred, and solid fuel is the third in terms of priority of propellants. Hybrid rockets use a fuel such as acrylic, polyethylene or polybutadiene and then flow a gaseous oxidizer like oxygen or nitrous oxide over the fuel surface. They are safer than ordinary solid motors yet still throttleable via the oxidizer. Of course when liquid propellant is utilized, there must be one or more valves to control the propellant and oxidizer; and in a hybrid rocket there must be a valve to control the oxidizer.

Attitude control of the vehicle is possible with a standard nozzle or multiple standard nozzles; preferably, though, a rocket plug nozzle is utilized, as described below and as illustrated in FIGS. 17 and 18.

For either the primary motor or the attitude control system motor a manifold and igniter exist unless the propellant is hypergolic, in which case an igniter is unnecessary. In the case of the rocket plug nozzle the manifold is located near the plug nozzle and regulates and distributes the propellant which is pressurize preferably from centripetal force created by spinning the vehicle.

The ACS nozzle of FIGS. 15, 17, and 18 penetrates the aero-shell. After the aero-shell is discarded along with the exterior ACS nozzle, the interior ACS nozzle is exposed for maneuvers in the vacuum of space.

FIG. 18 shows the annular ACS monopropellant tank is located inward of the plug nozzle. FIG. 18 is a cutaway. As best seen in FIG. 17, the plug nozzle and the ACS tank are distributed over the full 360 degrees. As shown in FIG. 18, the exhaust impinging on the ACS tank as shown can be problematic. Preferably, the plug nozzle is directed inward, preferably substantially 20 degrees inward; and the inner part of the nozzle extends below the ACS tank.

The ACS is controlled by a microprocessor and sensor package (not shown since these are traditional elements). The sensors include an accelerometer, a GPS, a radio transmitter and receiver, a horizon sensor, and a payload integrity sensor. One of ordinary skill in the art would understand control of the ACS system. This includes employees of Ball Aerospace, Boeing, Lockheed-Martin etc. who regularly maneuver satellites.) The sensor package preferably uses a combination of GPS and inertial guidance, plus active radio telemetry with the propellant station. This is discussed more on page 3 of the vehicle patent. The Russian's Progress resupply vehicle use an autonomous docking system comprised of the TsVM-101 digital flight computer plus the MBITS digital telemetry system. In 2007 DARPA also demonstrated autonomous docking with Orbital Express. DARPA used AVGS (Advanced Video Guidance System) to guide the docking.

The operation of the Gas Gun Launcher is as follows:

First the OBL is towed, as shown in FIG. 5, to a preferred ocean location. The thrusters in FIGS. 3 and 4 are used to align the launcher to the correct launch angle and azimuth. An equatorial launch location is often preferred to obtain maximum payload fraction. The down range is scanned with radar and visually to insure range safety.

Next the pump and launch tubes are cleaned; and, if honing (described more fully below) is to be utilized to cause the vehicle to spin, the launch tube is honed. The spin direction during honing can determine the amount and direction of spin imparted to the projectile in-bore. Then the launch tube is automatically aligned using feedback from sensors and subsequently applying tension (utilizing the tensioning cables as described above) in the case of the OBL. (The LBL is aligned instead using threaded actuators.) Next the launch vehicle is loaded with propellant and payload and inserted down the launch tube from the muzzle until it seats near the pump tube (and the sliding seal in the OBL) as in FIG. 6. If the propellant is cryogenic, then propellant may be vented and topped off as needed by thin tubing penetrations that reach the vehicle from outside the launch tube.

From this point on the system is operated remotely.

The fast-opening valve in the pump tube is closed while the fast closing valve in the muffler is opened. A diaphragm, preferably composed of MYLAR, is fastened across the muzzle prior to pulling a vacuum in the launch tube. A vacuum of a few Torr is pulled separately in both the launch tube and pump tube. Care must be taken to maintain lower pressure behind the projectile so that it does not get pushed toward the muzzle. Next the light gas, preferably hydrogen, or a mixture of light gases is fed into the pump tube as shown in FIG. 4 until it reaches about 3,000 psi and ambient temperature. The heat exchanger is then fed natural gas and air while an igniter maintains a flame. After about 10 minutes the heat exchanger has heated the hydrogen in the pump tube to approximately 1,700 Kelvin and 15,000 psi.

The tracking radars are notified and the fast-opening valve is opened. The vehicle is accelerated down the launch tube to high speed and pushes a small amount of shocked air in front like a snowplow. The shocked air impacts the diaphragm and blows it outward allowing the vehicle to exit the muffler unscathed. The hydrogen behind the vehicle stagnates against large areas of a fast-closing valve and drives the valve shut, effectively sealing off the launcher with the hydrogen inside. The hydrogen in the launcher takes several minutes to cool down and it is then pumped out, scrubbed and recycled into the hydrogen vessels shown in FIG. 3.

The fast-closing valve preferably comprises a partition sealingly connected to the inner surface of the muffler, containing an aperture adequate for the passage of the vehicle, and having a door for sealingly closing the aperture rotatably connected to the aperture on the side toward the pump tube. Alternatively, a ball with a diameter larger than the inner diameter of the muffler is placed on the bottom of the muffler, leaving adequate room for passage of the vehicle. The gas behind the vehicle then forces the door closed or pushes the ball into the open end of the muffler.

The hydrogen is expected to thermalize with the tube within 5-15 minutes. The pressure and temperature are anticipated to drop as follows:

|  | t = 0 | t = 1 sec | t = 10 minutes |
|---|---|---|---|
| Volume (m3) | 1,260 | 6,170 | 6,170 |
| Pressure (psi) | 15,000 | 1,620 | 720 |
| Temp (K) | 1,700 | 900 | 400 |

After approximately 10 minutes the hydrogen is pumped through a conventional industrial type scrubber and back into the storage tanks where it preferably resides near 2,650 psi and ambient temperature. While refilling the storage tanks the hydrogen temperature will increase adiabatically unless the tanks are cooled. The inventors expect this cooling can be accomplished, in the case of the OBL, with the surrounding seawater. The preceding is a standard industrial process, and there are hundreds of companies of ordinary skill in the art which can design and build the hydrogen scrubbing and recycling system.

The vehicle emerges from the muffler and the sabot petals are lifted away from the aero-shell by aerodynamic forces. The petals burn, because of air friction due to the high speed of the vehicle, while airborne and land within a few km of the muffler. The vehicle is either spinning on exiting the launch tube or spins up in the atmosphere due to the subtly canted fins. Vehicle orientation changes are made if needed by driving gyroscopic precession. The angular precession rate is given by:

Angular Rate=Torque/Angular momentum (Eqn. 2)

(Here torque is applied at right angles to the angular momentum axis. See "The Feynman Lectures on Physics" Vol. 1 Chapter 20, p. 6, Eqn. 20.15.)

The preferred ACS has a major novel feature in that it achieves orientation via stroboscopically applying thrust at right angle to the spin axis of the vehicle in accordance with Eqn. 2 above. This is important and different. Alternatively we can use conventional ACS thrust maneuvers which don't require a spinning vehicle, but they do require more thrusters. (Conventionally 2 thrusters for pitch and 2 for yaw located near the nose, as well as 2 for roll located near the center of mass.)

Spinning the vehicle can be performed several ways. The fins will be very small canted protuberances on the aft section. They will not stick out more than say 5% of the vehicle diameter, and are expected to have a cant angle of 1 degree<theta<5 degrees. Their length can be 5-100% of the vehicle diameter. Optionally, grooves similarly oriented on the surface of the vehicle can be employed. And alternatively the inventors believe a practical technique is pre-spinning the vehicle in the launcher prior to launch by spinning the section of launch tube containing the vehicle is. The other option is to hone the barrel preferentially in one direction. Of the three techniques, pre-spinning the vehicle is likely the most precise. The fin option however, has a side benefit in that it will stabilize the projectile both gyroscopically as well as by moving the center of pressure aft of the center of gravity. All of these methods can be accomplished by one skilled in the art; however, significant engineering and testing will be required.

Eqn. 2 is more transparent here: Dtheta=Dt*Force*(length to center of mass)/Angular momentum. Force being that applied by the ACS single thruster as it pulses. Sensors determine the orientation of the vehicle so that the microprocessor, or controller, can issue commands to achieve the desired orientation. Naturally there are other sensors on-board to determine where the vehicle is relative to the depot as well as the relative velocity etc. There are also the usual payload integrity sensors etc.

As the vehicle ascends through the atmosphere, the aero-spike sees maximum heating and will ablate substantially. The rest of the aero-shell should remain largely undisturbed although the minimal fins may also get ablated somewhat. After attaining approximately 60 to 100 km altitude the aero-shell will be ejected exposing the rocket motor and payload. Shortly thereafter, the rocket is ignited and burns for approximately 100 seconds as it nears the orbital depot. The spinning rocket causes significant centripetal propellant pressure thereby, in the preferred embodiment, circumventing the need for a tank pressurization device or a turbo-pump. The ACS is in communication with the depot and continues to guide the spinning rocket/payload assembly as they approach the depot.

Upon arriving near the depot a robotic tug fields the rocket/payload assembly. It determines payload integrity and then delivers the assembly to the propellant depot where the propellant is siphoned off.

Alternatives or options in addition to those discussed above are as follows:

The hydrogen may be heated externally to the pump tube with a self-contained heat exchanger using natural gas or another hydrocarbon and air.

A mixture of gases, for example hydrogen, helium and oxygen may be heated and their hot reaction products used to propel the vehicle through the launcher.

An all steel, non-buoyant launcher may be used even for the OBL. Of course, with the OBL the cable supports/buoyancy compensators and the recoil fins/buoyancy compensators make this feasible.

Composites may include Fiberglass, Spectra, Kevlar and other high strength fibers.

The launcher may be towed and serviced by a ship instead of using the Maintenance Platform.

The recoil fins in the breech area may be replaced with conventional shock absorbers.

The launcher may employ a rotating section of the launch tube to impart spin to the vehicle prior to launch. This may be needed to spin up the fluids in the vehicle, since they will not spin up so rapidly as a solid propellant vehicle would.

The launcher can be based in a tunnel.

And the launch tube and pump tube can be placed on support members.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

And non-essential features may be utilized in any and all practical combinations.

INDUSTRIAL APPLICABILITY

The way in which the Gas Gun Launcher is capable of exploitation in industry and the way in which the Gas Gun Launcher can be made and used are obvious from the description and the nature of the Retractable Hose Extension for a Vacuum.

The invention claimed is:

1. A gas gun launcher for launching a vehicle into space, which comprises:
   a launch tube having a first end and a second end;
   a heat exchanger configured to heat a light gas, thereby forming heated light gas;
   a high-speed opening valve in fluid communication with the first end of said launch tube and in fluid communication with the heat exchanger to receive the heated light gas from the heat exchanger; and
   a recoil absorber comprising recoil fins located at the first end of said launch tube
   wherein the gas gun launcher has neutral buoyancy in water.

2. A gas gun launcher according to claim 1 wherein the gas gun launcher comprises buoyancy compensators.

3. A gas gun launcher according to claim 1 wherein the heat exchanger has a combustor to provide the heat that heats the light gas.

4. A gas gun launcher according to claim 3 wherein the heat exchanger and the combustor are located within a pump tube in fluid communication with the launch tube.

5. A gas gun launcher according to claim 1 wherein the recoil absorber comprises a shock absorber.

6. A gas gun launcher according to claim 4 wherein the pump tube is movable relative to the launch tube.

7. A gas gun launcher according to claim 6 and further comprising a sliding seal bridging the connecting area of the pump tube and the launch tube to prevent escape of the light gas.

8. A gas gun launcher according to claim 1 wherein the launcher has no compression piston for the light gas.

9. A gas gun launcher according to claim 1 and further comprising a closure for the launch tube.

10. A gas gun launcher according to claim 9 and further comprising a light gas recycling system.

11. A gas gun launcher according to claim 10 wherein the light gas recycling system has a sliding seal and a shock absorbing system.

12. A gas gun launcher according to claim 1 wherein the launch tube has a first section configured to spin to impart a spin to the vehicle during launch.

13. A gas gun launcher according to claim 1 wherein the launch tube has an interior surface that is honed to impart a spin to the vehicle during launch.

14. A gas gun launcher according to claim 1 where the launch tube has a replaceable refractory liner.

15. A gas gun launcher according to claim 1 and further comprising an automatic launch tube alignment system.

16. A gas gun launcher for launching a vehicle into space, which comprises:
    a launch tube having a first end and a second end;
    a high-speed opening valve positioned at the first end of the launch tube and configured to control admission of a light gas to the first end of the launch tube as the valve opens so that the light gas is initially below a peak pressure at the vehicle as the vehicle moves from the first end of the launch tube and toward the second end of the launch tube, said valve sealing against a seat; and
    a recoil absorber comprising recoil fins located at the first end of said launch tube,
    wherein the gas gun launcher has neutral buoyancy in water.

17. A gas gun launcher according to claim 16 wherein said seat has a tapered end.

18. A gas gun launcher according to claim 16 wherein the high-speed opening valve has a shape and a mass such that the light gas is initially below said peak pressure at the vehicle as the vehicle moves from the first end of the launch tube and toward the second end of the launch tube.

19. A gas gun launcher according to claim 18 wherein said high-speed opening valve's shape and mass are such that the light gas is at a peak pressure at the vehicle as said vehicle reaches a distance beyond about a third of a length of the launch tube during launch.

20. A gas gun launcher according to claim 19 wherein the light gas comprises hydrogen.

21. A gas gun launcher according to claim 20 wherein the light gas consists of hydrogen.

22. A gas gun launcher according to claim 20 wherein the light gas further comprises helium.

23. A gas gun launcher for launching a vehicle into space, which comprises:
    a launch tube having a first end and a second end and a longitudinal axis;
    a high-speed opening valve in fluid communication with the launch tube to admit a light gas to the launch tube; and
    a high-speed opening valve brake configured to provide a retaining force against the high-speed opening valve to hold the high-speed opening valve closed against pressure applied to the high-speed opening valve by the light gas; and
    a recoil absorber comprising recoil fins located at the first end of said launch tube,
    wherein the gas gun launcher has neutral buoyancy in water.

24. A gas gun launcher according to claim 23 wherein the brake comprises hydraulic pistons that clamp the high-speed opening valve in a closed position.

25. A gas gun launcher according to claim 23 wherein the brake comprises squibs that remove the retaining force.

26. A gas gun launcher according to claim 23 wherein the high-speed opening valve is on a longitudinal axis of the launch tube.

* * * * *